US007200380B2

(12) United States Patent
Havlark et al.

(10) Patent No.: US 7,200,380 B2
(45) Date of Patent: *Apr. 3, 2007

(54) WIRELESS TELECOMMUNICATIONS LOCATION BASED SERVICES SCHEME SELECTION

(75) Inventors: Arlene Havlark, Seattle, WA (US); Victor Burton, Bellevue, WA (US); John Ahrens, Maple Valley, WA (US)

(73) Assignee: TeleCommunication Systems, Inc., Annopolis, MD (US)

( * ) Notice: Subject to any disclaimer, the term of this patent is extended or adjusted under 35 U.S.C. 154(b) by 797 days.

This patent is subject to a terminal disclaimer.

(21) Appl. No.: 10/379,940

(22) Filed: Mar. 6, 2003

(65) Prior Publication Data

US 2003/0225515 A1    Dec. 4, 2003

Related U.S. Application Data

(60) Provisional application No. 60/367,707, filed on Mar. 28, 2002.

(51) Int. Cl.
*H04M 11/00* (2006.01)
*H04Q 7/20* (2006.01)
(52) U.S. Cl. .................. 455/404.2; 455/456.1
(58) Field of Classification Search ........... 455/404.2, 455/433, 435.1, 435.2, 440, 456.1, 456.3, 455/456.5
See application file for complete search history.

(56) References Cited

U.S. PATENT DOCUMENTS

| | | | | | |
|---|---|---|---|---|---|
| 5,974,300 | A | * | 10/1999 | LaPorta et al. | 340/7.23 |
| 6,757,545 | B2 | * | 6/2004 | Nowak et al. | 455/456.2 |
| 6,813,501 | B2 | * | 11/2004 | Kinnunen et al. | 455/456.2 |
| 6,868,074 | B1 | * | 3/2005 | Hanson | 370/328 |
| 6,885,869 | B2 | * | 4/2005 | Raith | 455/456.6 |
| 2002/0173317 | A1 | * | 11/2002 | Nykanen et al. | 455/456 |

* cited by examiner

*Primary Examiner*—Benny Quoc Tieu

(57) ABSTRACT

An intelligent system for choosing selection schemes to be tried in a predetermined order for determining the location of a wireless mobile client, including retrieving a last known position record from a cache, checking serving network capability, choosing an initial selection scheme according to parameters including at least the required response time and the requested location method, including a method employing navigational satellites, attempting to retrieve a current position record, trying successive untried selection schemes in turn according to a predetermined algorithm if no current position record has been retrieved, and returning the current position record and updating the last known position record, or returning an error if no current position record has been retrieved, and returning the last known position record if an error has been returned, the last known position record exists in the cache and the last known position record has not expired.

24 Claims, 30 Drawing Sheets

FIG. 8
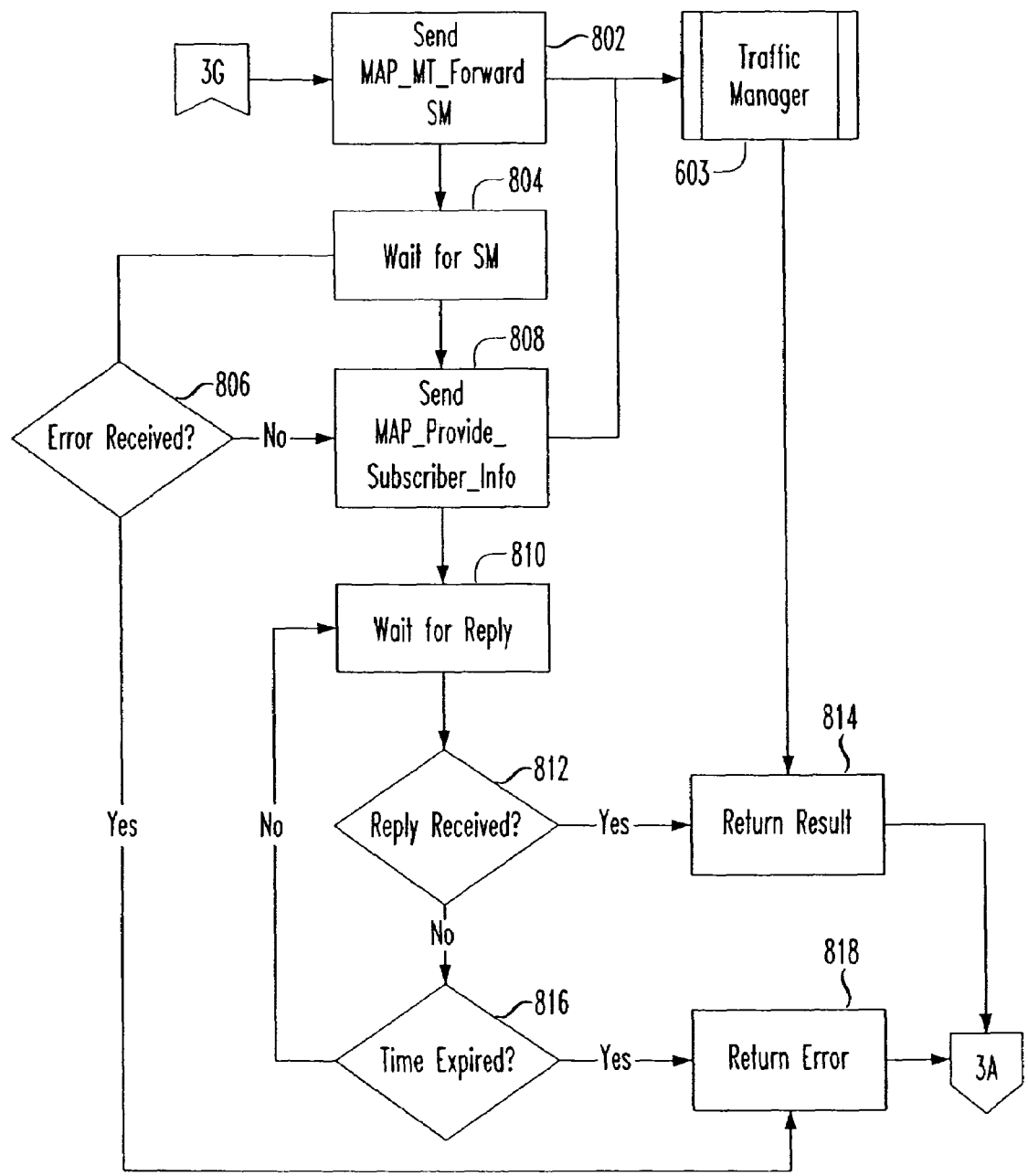
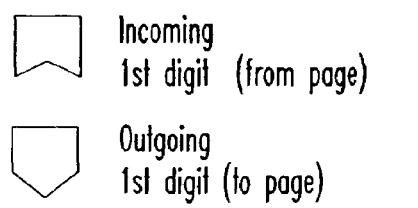

FIG. 14

| Method 0 | Return Error -- this request cannot be satisfied. If there is an entry in the PositionXLPDB, NetworkCache, return it. |
|---|---|
| Method 1 | MAP_ProvideSubscriberInfo |
| Method 2 | MAP_AnyTimeInterrogation |
| Method 3 | MAP_MT_ForwardShortMessage<br>MAP_ProvideSubscriberInfo |
| Method 4 | MAP_SendRoutingForShortMessage<br>MAP_MT_ForwardShortMessage<br>MAP_ProvideSubscriberInfo |
| Method 5 | MAP_ProvideSubscriberLocation |
| Method 6 | MAP_SendRoutingForLCS<br>MAP_ProvideSubscriberLocation |
| Method 7 | A-GPS |
| Method 8 | If (HomeCarrierNetworkType == 3G) then MAP_SendRoutingForLCS;<br>Else then MAP_SendingRoutingforSM; |
| Method 9 | MAP_SendRoutingForShortMessage<br>MAP_MT_ForwardShortMessage<br>MAP_AnyTimeInterrogation |
| Method 10 | MAP_MT_ForwardShortMessage<br>MAP_AnyTimeInterrogation |

FIG. 15

| Response Time | This parameter comes from the Usher_TIF_LocationRequest. |
|---|---|
| Location Method | This parameter comes from the Usher_TIF_LocationRequest. |
| Terminal Capability | This parameter comes from the Usher_TIF_LocationRequest, but will not be used by H3G at product launch. |
| Position Request Type | This parameter comes from the Usher_TIF_LocationRequest. |
| MSC in Cache | This parameter comes from the Position XLPDB, NetworkCache table. |
| MSC MAP Version Home | This parameter is derived from the MSC message version numbers in the GSMProvDB, MSC table for the provSubLoc (MAP_Provide_Subscriber_Location_message). |
| Network Type | This parameter comes a configurable in TIF.cfg |
| MSC Network Type | This parameter comes from the GSMProvDB. First the MSC table is queried for the PLMN ID. Then the PLMN table is queried for Network type. If the Network type is HOME_CARRIER, then the configurable is checked. This is the default network type for the MSC. However, this can be overridden by the following logic:<br>-if the values for the versions of all messages are zero, it is assumed the versioning for this MSC is not provisioned -- the default is used.<br>If version numbers are supplied for at least some of the MAP messages:<br>-if provSubLocVersion >=3, msc network type = 3G.<br>-if 0 < provSubInfoVersion < 3, msc network type = 2G.<br>- else, msc network type = 2.5G. |
| Roaming | This parameter comes from the GSMProvDB. First the MSC table is queried for the PLMN ID. Then the PLMN table is queried for Network Type. If the Network Type is HOME_CARRIER, roaming is false. If the Network Type is anything other than HOME_CARRIER, Roaming is true. Note that this decision can only be made once the MSC is obtained, that is, after the MAP_SendRoutingInfo_for_SM has been sent. |

WIRELESS TELECOMMUNICATIONS LOCATION BASED SERVICES SCHEME SELECTION

Priority is claimed from co-pending U.S. application Ser. No. 60/367,707, filed Mar. 28, 2002, entitled "Wireless Telecommunications Location Based Services Scheme Selection"; and from co-pending U.S. application Ser. No. 10/399,403, filed Jan. 10, 2003, entitled "Wireless Telecommunications Location Based Services Scheme Selection", the entirety of both of which are expressly incorporated herein by reference.

BACKGROUND OF THE INVENTION

1. Field of the Invention

This invention relates generally to wireless communication carriers. More particularly, it relates to wireless telecommunications location-based services.

2. Background of Related Art

The position of a wireless client may be used for a variety of different purposes. The position of a mobile client may be provided in response to a request for the same via a wireless network. Position or location of a wireless device (e.g., a cell phone) may be used, e.g., in a vehicle-based navigation system, or to otherwise generally display or inform a requesting party of the position of a particular wireless device.

SUMMARY OF THE INVENTION

In accordance with the principles of the present invention, a method of responding in a wireless network to a location request comprises determining a sensitivity of delay to a response to the location request. Based on the determined sensitivity, a selection is made between a cached last known position of a relevant subscriber, and newly determined position information.

In accordance with another aspect of the present invention, a method of responding in a wireless network to a location request comprises determining a sensitivity of delay to a response to the location request. Based on the determined sensitivity, a selection is made between retrieval of a cached last known position record of a relevant subscriber, if available, and a next untried selection scheme if no current position record has been retrieved.

BRIEF DESCRIPTION OF THE DRAWINGS

Features and advantages of the present invention will become apparent to those skilled in the art from the following description with reference to the drawings, in which:

FIG. 8 shows exemplary scheme selection method 3 wherein position information of a target user equipment is available from a cache database, in accordance with the principles of the present invention.

FIG. 14 shows method definitions of another embodiment of the present invention.

FIG. 15 exemplary scheme selection parameters of the embodiment shown in FIG. 14.

DETAILED DESCRIPTION OF ILLUSTRATIVE EMBODIMENTS

The present invention provides an intelligent system that determines the location of a wireless mobile user by choosing selection schemes according to input parameters. The input parameters may include, e.g., a required response time, and/or a requested location method. The selection schemes may also be chosen according to the capabilities of the particular user's mobile device and the wireless network, to the availability of a navigational satellite and/or of a cached position record, to the version number of the utilized software, and/or to whether or not the mobile client is roaming. In the event that repeated tries are necessary, successive selection schemes to be tried are determined, as well as the order in which the selection schemes are to be tried.

A process according to another aspect of the present invention includes retrieving a last known position record from a cache, checking the capabilities of a serving network, and choosing an initial selection scheme according to parameters. The parameters preferably include at a minimum a required response time and a requested location method. The requested location method may include a method employing a navigational satellite.

Yet another process in accordance with another aspect of the present invention includes attempting to retrieve a current position record by an initial selection scheme. If no current position record is retrieved, successive untried selection schemes are tried in turn according to a predetermined algorithm until a current position record is returned. The last known position record is updated, or an error is returned if a current position record has not been retrieved. The last known position record is returned if an error has been returned, if the last known position record exists in the cache, and the last known position record has not expired.

In a wireless network, there are potentially several messages (e.g., Signaling System No. 7 (SS7)) messages which can be used to request and thereby obtain a subscriber's location. The particular process used to obtain the location is referred to herein as "scheme selection".

Scheme selection in accordance with the principles of the present invention determines which of a plurality of possible messages to send, as well as a preferred order in which to send them, particularly when a message fails to result in obtaining a subscriber's location.

A location services platform scheme selection service in accordance with the principles of the present invention makes an intelligent choice between multiple possible SS7 messages used to obtain a subscriber's location. In the disclosed embodiments, the choice is preferably based upon a combination of location request parameters, e.g., the subscriber's equipment capabilities, the network type, and/or the capabilities of the network.

The present invention may be implemented in any suitable location service platform.

Figure 1:
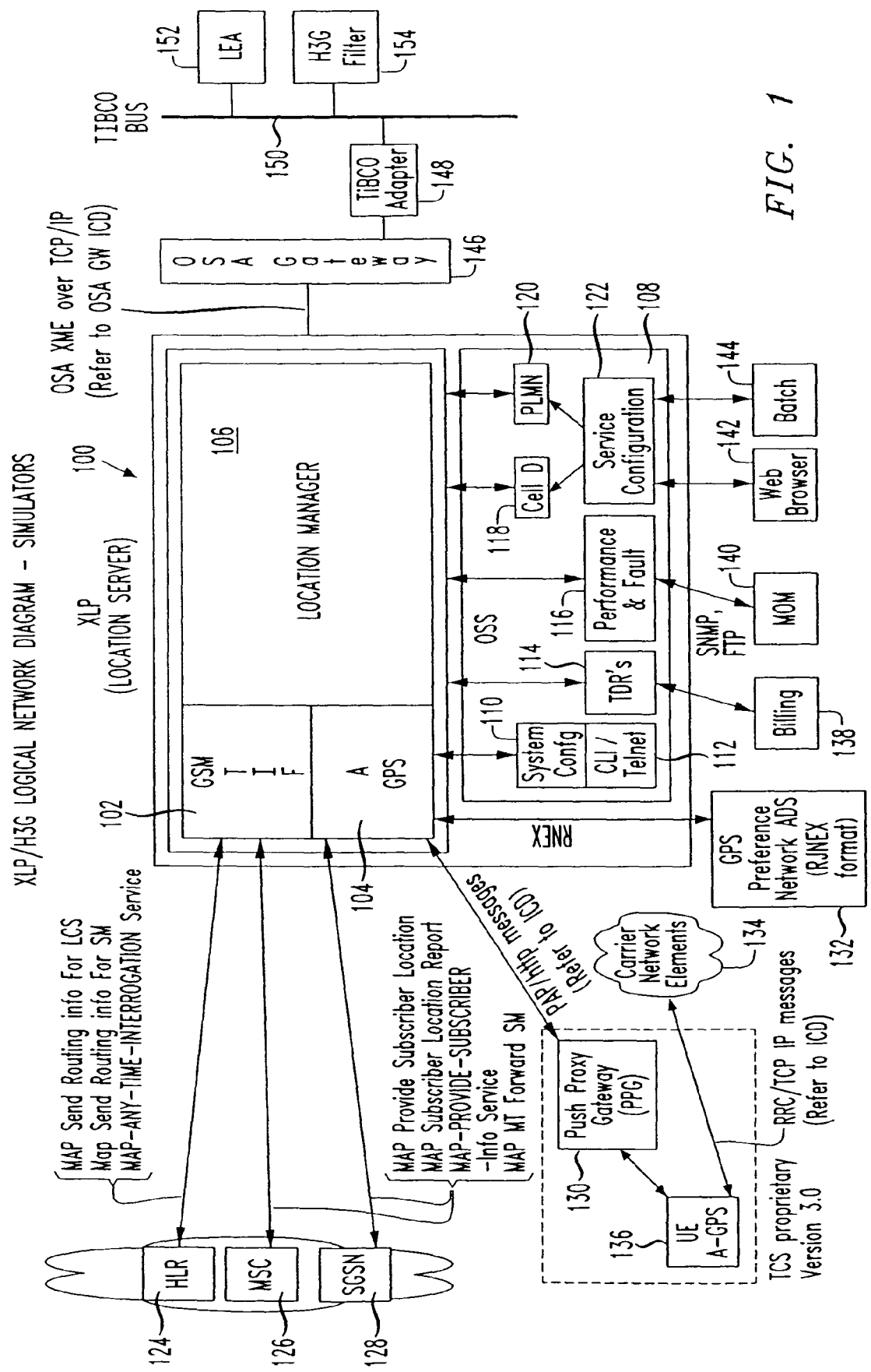
FIG. 1 shows exemplary network architecture of scheme selection in a location platform, in accordance with the principles of the present invention.

FIG. 1 shows exemplary network architecture for scheme selection in a location platform, in accordance with the principles of the present invention.

In FIG. 1, a location platform (XLP) location server 100 includes a Telecommunication InterFace (TIF) 102, an Assisted Global Positioning Satellite (Assisted GPS, or AGPS) unit 104, a location manager 106 and an Operations Support System (OSS) 108. The OSS 108 further includes system configuration means 110 with a Command Line Interface/Telnet interface 112, Transaction Detail Records (TDRs) 114, a performance and fault module 116, Cell Data 118, Public Land Mobile Network (PLMN) database 120 and service configuration means 122. TIF 102 is connected to Home Location Register (HLR) 124 and Mobile Switch Center (MSC) 126, and Assisted GPS 104 is connected to Serving GPRS Support Node (SGSN) 128 and Push Proxy Gateway (PPG) 130 and GPS reference network 132. Carrier network elements 134 are connected to XLP 100, and both carrier network elements 134 and PPG 130 are connected to User Equipment 136. Billing means 138 are connected to Transaction Detail Records (TDRs) 114. Message Oriented Middleware (MOM) 140 is connected to performance and fault module 116. Service configuration means 122 are configured to be accessed by a web browser 142 or by batch means 144. XLP 100 is also connected via OSA (Open Services Architecture) gateway 146 and adapter 148 to bus 150, which in turn is connected to Location Enterprise Application (LEA) 152.

A plurality of methods may be implemented. In one disclosed embodiment, a Xypoint™ Location Platform (XLP) Telecommunication InterFace (TIF) scheme selection function is responsible for deciding which method should be used when the XLP receives a location service request from a location application, based on the parameters of the request, and the capabilities of core network components. In addition, if a method fails, the Telecommunication InterFace (TIF) scheme selection function may also decide whether another method should be triggered, or if an error should instead be reported.

Once a method is selected, a sequence of MAP messages may be initiated by the Telecommunication InterFace (TIF) to the core network, and responses from the core network may be processed by the TIF as well, or Assisted GPS related messages will be exchanged between the XLP and the core network.

Preferably, the Home Location Register (HLR)s will support 3rd Generation Partnership Project (3GPP) Release 99 version of the Mobile Application Part (MAP). In the disclosed embodiments, the XLP uses only the Release 99 MAP version to communicate with the Home Location Register (HLR). It is assumed for the purposes of the enclosed embodiments that other network components (e.g., of roaming partners) may be compliant with MAP version 1, MAP version 2 or MAP version 3 for Phase 2+.

Location Request

Table 1 shows exemplary parameters that may be provided by an Immediate Request. The parameters are preferably passed through an Open Services Architecture (OSA) interface.

TABLE 1

Parameters of location request

| Parameter name | Notes |
| --- | --- |
| Priority | NORMAL or HIGH |
| Accuracy | Unsigned Long (radius in meters) |
| Type | CURRENT, CURRENT_OR_LAST_KNOWN, or INITIAL. |
| ResponseTime | NO_DELAY, return initial or last known; LOW_DELAY, attempt update but return best available within time constraint; DELAY_TOLERANT, get updated value; USE_TIMER_VALUE, get current position within response time requirement. |
| AltitudeRequested | Altitude request flag. |
| RequestedLocation Method | Network = default or AGPS |
| Timer | Time in seconds to respond used for USE_TIMER_VALUE responseTime. |

Main Process of Scheme Selection

Figure 2:
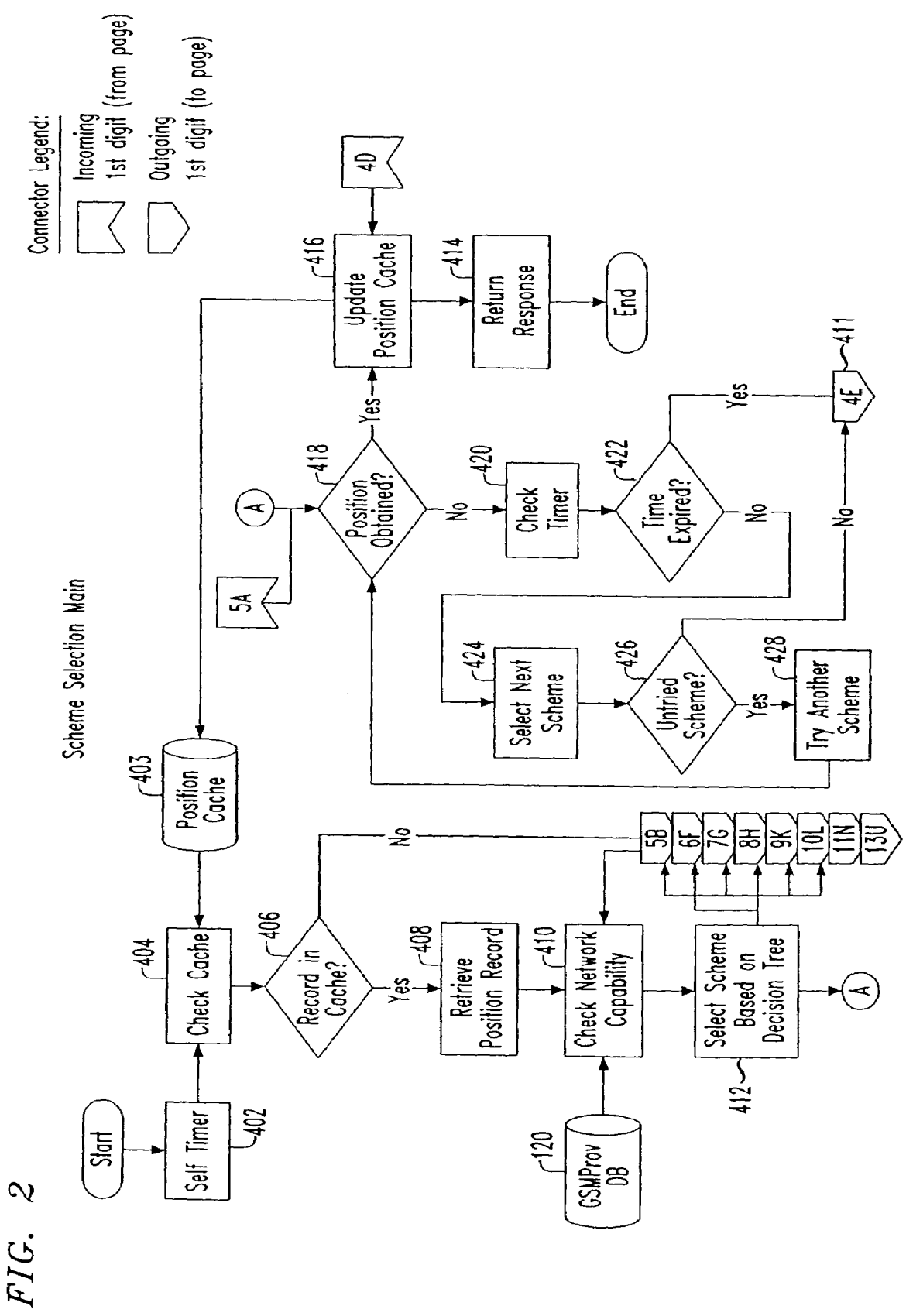
FIG. 2 shows an exemplary scheme selection main process, in accordance with the principles of the present invention.

FIG. 2 shows an exemplary scheme selection main process, in accordance with the principles of the present invention.

In particular, when receiving a location request, the Telecommunication InterFace (TIF) 102 starts a timer in step 402. The timer value is either indicated by the received request, or is set to a default value when a timer value is not provided. Based on the target subscriber identifier, Mobile Station ISDN (MSISDN), the Telecommunication InterFace (TIF) 102 checks the Position Cache database 403 in step 404 and determines whether a position record exists in step 406. If a position record exists, the Telecommunication InterFace (TIF) 102 then retrieves the record in step 408 and checks the serving network (meaning Mobile Switch Center (MSC) or Serving GPRS Support Node (SGSN)) capability in step 410 from a pre-provisioned Public Land Mobile Network (PLMN) database 120.

Figure 3:
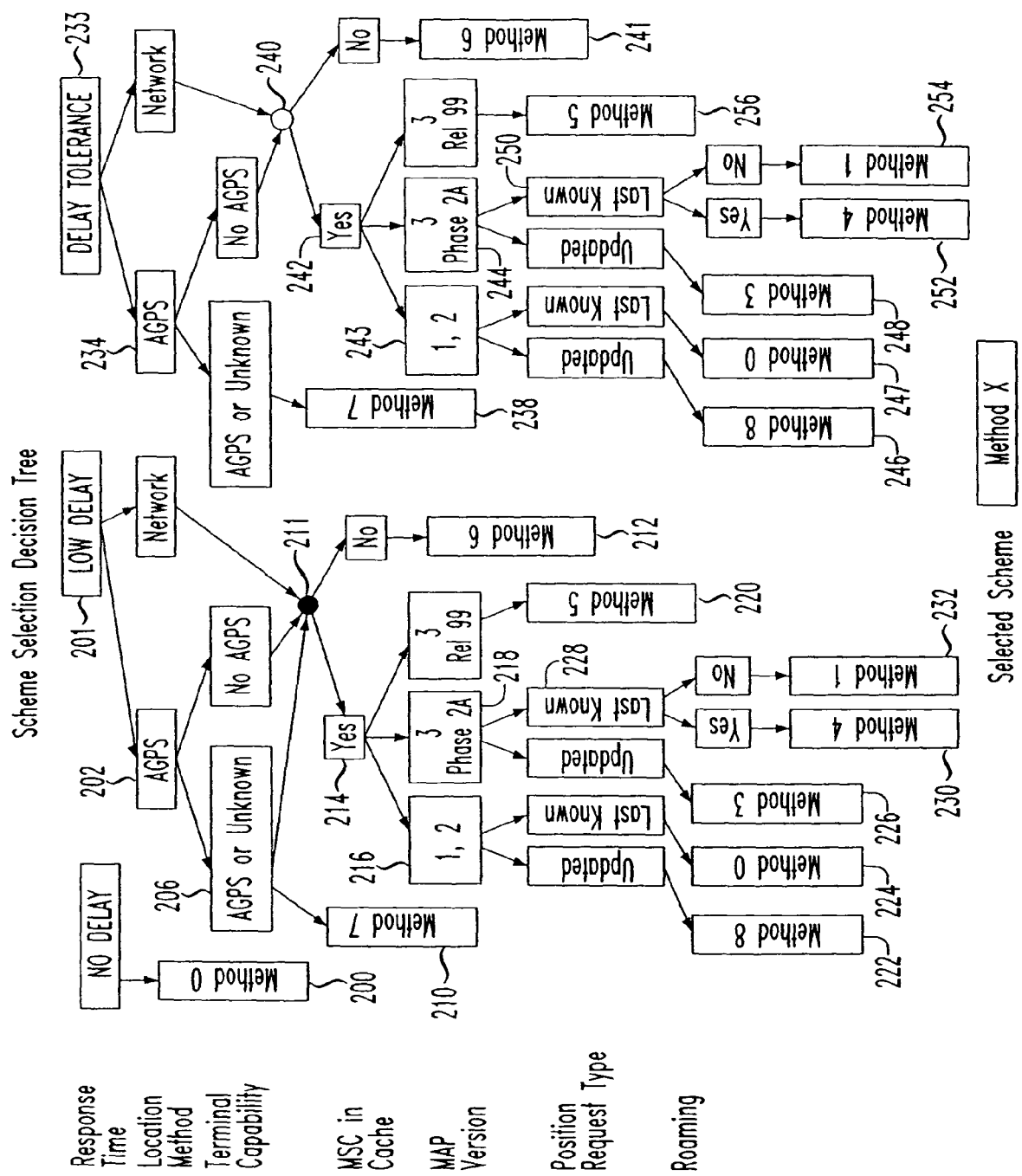
FIG. 3 shows an exemplary scheme selection decision tree, in accordance with one aspect of the present invention.
Figure 4:
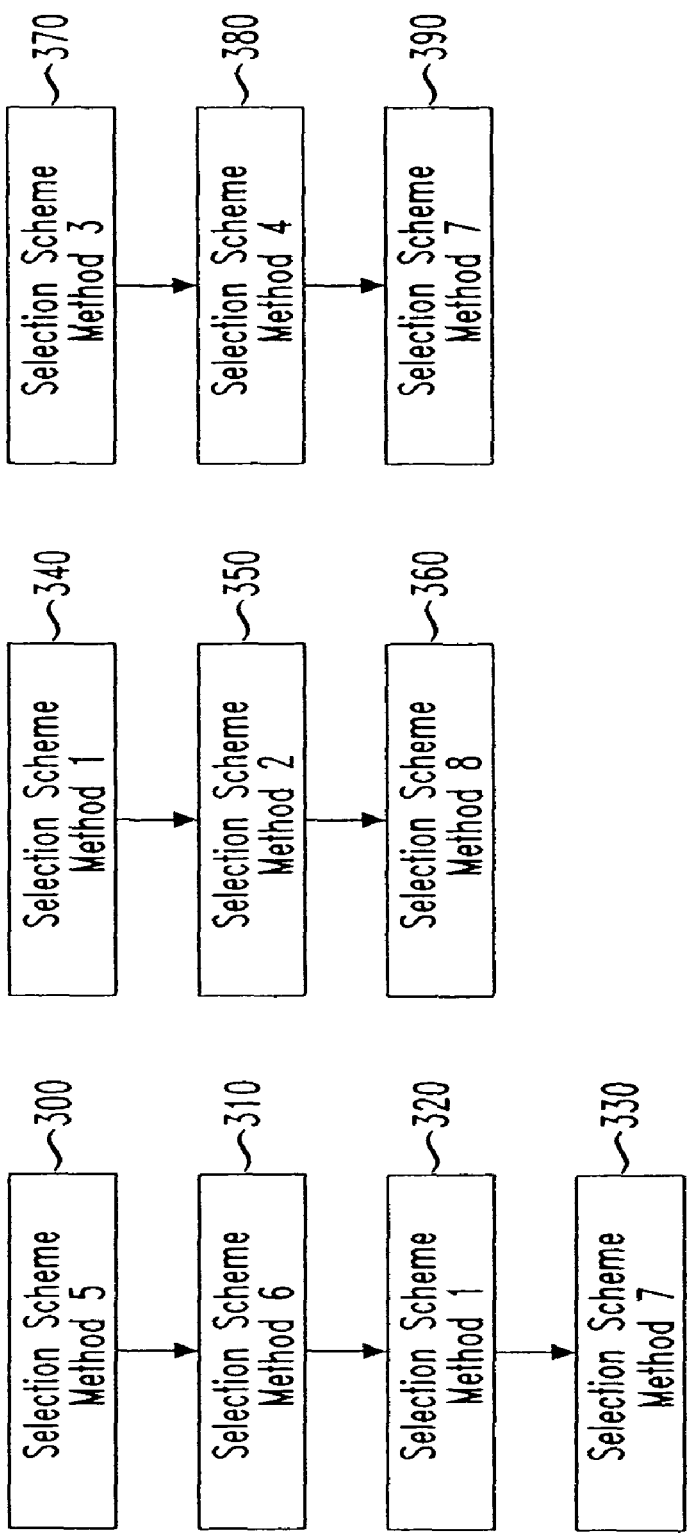
FIG. 4 shows a strategy for selecting an alternate scheme for a retry, in accordance with the principles of the present invention.

With all this information, including the request parameters and potential network capability, the Telecommunication InterFace (TIF) 102 uses the logic defined in FIG. 3 to select a method to retrieve the position information from the core network in step 412. FIG. 4 also shows the mechanism for possible retry once a method fails. FIGS. 3 and 4 will be discussed a bit further down.

In step 418 it is determined whether a position has been obtained, and if so, then the method proceeds to step 416, or if not, then in step 420 the timer is checked. In step 422, it is determined whether the timer has expired, and if not, then the next selection scheme is selected in step 424. In step 426 it is determined whether the selected scheme has been tried before, and if the scheme is untried, then in step 428 the selected scheme is tried, and then the method returns to step 418.

In a successful scenario, including the case with several retries, the Telecommunication InterFace (TIF) 102 will return the retrieved position information to the OSA (Open Services Architecture) interface in step 414, which passes to the location application. At the same time, the Telecommunication InterFace (TIF) 102 also updates the Position Cache database 403 in step 416.

In an unsuccessful scenario, in step 411 the Telecommunication InterFace (TIF) 102 will return the last known position information retrieved from the Position Cache database 403 with an error, or just an error if no cached location information is available (or the information expires).

Exemplary Scenarios

The following methods have been defined as exemplary schemes for an XLP to use to retrieve location information, either from a core network or locally from a cache database of the XLP.

Method 0: Requested position not obtainable, existing information from the cache database, if it is not expired, will be returned if available.

Method 1: Use MAP_Provide_Subscriber_Info and cached MSC-number to retrieve the requested position information.

Method 2: Use MAP_Any_Time_Interrogation to retrieve the requested position information.

Method 3: Use Mobile Terminated (MT) Short Message (refresh location information), MAP_Provide_Subscriber_Info and cached MSC-number (Mobile Switch Center-number) to retrieve the requested position information. (Phase 2+)

Method 4: When a cached MSC is not available, use MAP_Send_Routing_For_S_M to the HLR to obtain the MSC number. Then, use the mobile terminated (MT) short message to refresh location information filled by the MAP_Provide_Subscriber_Info.

Method 5: Use MAP_Provide_Subscriber_Location and cached MSC-number to retrieve the requested position information. (Release 99)

Method 6: When a cached MSC is not available, use MAP_Send_Routing for LCS to obtain the MSC number, then use MAP_Provide_Subscriber_Location to retrieve the requested position information. (Release 99)

Method 7: Use Assisted GPS (AGPS) to retrieve the requested position information. (Release 99).

Method 8: Use MAP_Send_Routing_Info_For_SM to retrieve the current MSC-number when no cached MSC-number is available.

Detailed Scheme Selection

FIG. 3 shows an exemplary scheme selection decision tree, in accordance with one aspect of the present invention.

If No Delay is required, then AGPS and core network requests are not possible, and the Method 0 is selected in step 200.

Alternatively, if Low Delay is required, then in step 201 only core network methods are selected. In step 211 the internal database 403 is queried to determine whether location information of the target subscriber is cached in the database 403. If the location information is not cached in the database 403, then in step 212 Method 6 is selected. If the location information is cached in the database 403, then in step 214 the MAP version is determined. If the MAP version is Release 99, then in step 220 Method 5 is selected. If the MAP version is 2+, then in step 218 it is determined whether the position request type is Updated. If the position request type is Updated, then in step 226 Method 3 is selected. If not, then in step 228 it is determined whether or not Roaming applies. If the mobile is roaming, then Method 9 is selected in step 230, and if not, then in step 232 Method 1 is selected. If the MAP version is other than 2+ or Release 99, then in step 216 it is determined whether the position request type is Updated. If so, then in step 222 Method 8 is selected, and if not, then in step 224 Method 0 is selected.

Similarly, if the Response Time is Delay Tolerant, then in step 233 either AGPS or Network is selected according to the requested Location Method. If AGPS was requested, then in step 234 the terminal capability is determined, and if the terminal is capable of AGPS or unknown, then in step 238 Method 7 is selected. If either Network was selected in step 233, or it was determined that the terminal capability did not include AGPS in step 234, then in step 240 the internal database 403 is queried to determine whether location information of the target subscriber is cached in the database 403. If the location information is not cached in the database 403, then in step 241 Method 6 is selected. If the location information is cached in the database 403, then in step 242 the MAP version is determined. If the MAP version is Release 99, then in step 256 Method 5 is selected. If the MAP version is 2+, then in step 244 it is determined whether the position request type is Updated. If the position request type is Updated, then in step 248 Method 3 is selected. If not, then in step 250 it is determined whether or not Roaming applies. If the mobile is not roaming, then Method 4 is selected in step 252, and if not, then in step 254 Method 1 is selected. If the MAP version is other than 2+ or Release 99, then in step 243 it is determined whether the position request type is Updated. If so, then in step 246 Method 8 is selected, and if not, then in step 247 Method 0 is selected.

As discussed above, FIG. 3 presents a key concept of scheme selection. When receiving a location request the location application, firstly the Telecommunication InterFace (TIF) 102 examines the requesting parameters. Based on Accuracy and RequestedLocationMethod, the TIF 102 decides if Assisted GPS (AGPS) method (Method 7) should be used. Note that the Response Time and the request Type are taken into account for the decision as well, e.g. if NO-DELAY is required then the Assisted GPS (AGPS) method is not possible. If the AGPS method is not possible, or the request asks for a non-AGPS method, e.g. if RequestLocationMethod=Network, then the Telecommunication InterFace (TIF) 102 queries the internal database 403 to see if location information of the target subscriber is cached in the database 403. Note that the location information of a certain subscriber includes the serving Mobile Switch Center (MSC)/Serving GPRS Support Node (SGSN) number, and supported Mobile Application Part (MAP) version etc. Based on the MAP version and other request parameters, the Telecommunication InterFace (TIF) 102 will decide which method should be used for the request.

If there is no location information record of target User Equipment, Telecommunication InterFace (TIF) 102 will trigger Method 6 to retrieve the serving Mobile Switch Center (MSC)/Serving GPRS Support Node (SGSN) information, and assume the serving Mobile Switch Center (MSC)/Serving GPRS Support Node (SGSN) supports Release 99 Mobile Application Part (MAP) version.

Upon a failure of a certain selected method, the Telecommunication InterFace (TIF) 102 will try a different method as long as the timer for this location request transaction has not yet expired, or until a user_specified number of retries have been executed, or until no more reasonable retries remain.

FIG. 4 shows a strategy for selecting an alternate scheme for a retry, in accordance with the principles of the present invention.

In particular, as shown in FIG. 4, if the original method employed in step 300 is method 5, then successive attempts may employ, e.g., method 6 in step 310, method 1 in step 320, and method 7 in step 330. If the original method is method 1 in step 340, successive attempts may employ method 2 in step 350 and method 8 in step 360. If the original method is method 3 in step 370, successive attempts may employ method 4 in step 380 and method 7 in step 390.

Method 0

Figure 5:
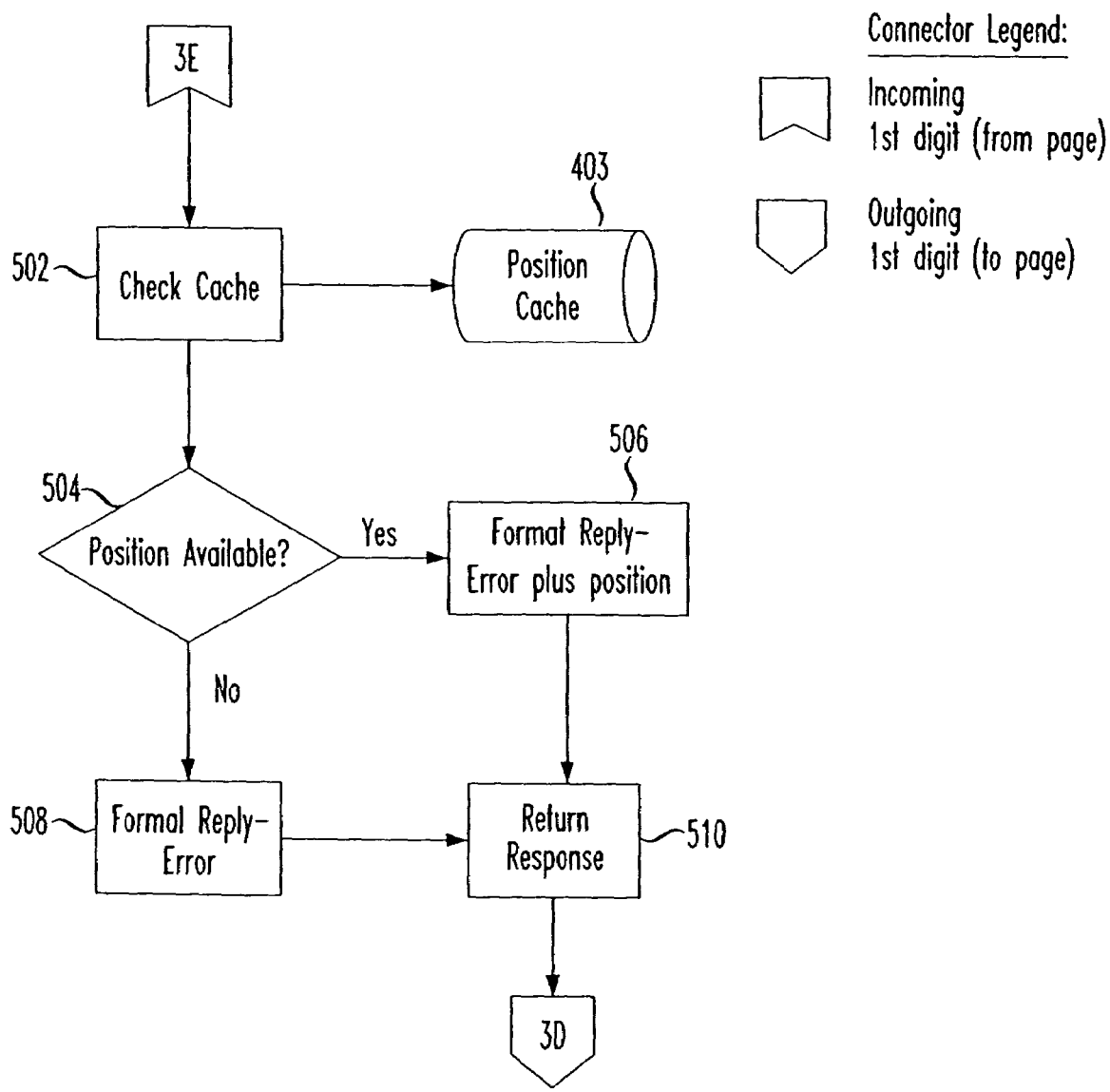
FIG. 5 shows exemplary scheme selection method 0 wherein a requested position is not obtainable, in accordance with the principles of the present invention.

FIG. 5 shows exemplary scheme selection method 0 wherein a requested position is not obtainable, in accordance with the principles of the present invention.

In particular, FIG. 5 shows the detailed procedure of method 0. Method 0 is used in the case that the requested position is not obtainable.

In step 502 the position cache database 403 is checked and in step 504 it is determined whether a position is available. If a position is available, then in step 506 a reply is formatted including an error plus a position and in step 510 a response is returned. If no position is available, then in step 508 a reply is formatted including only an error signal, and in step 510 the response is returned.

Method 1

Figure 6:
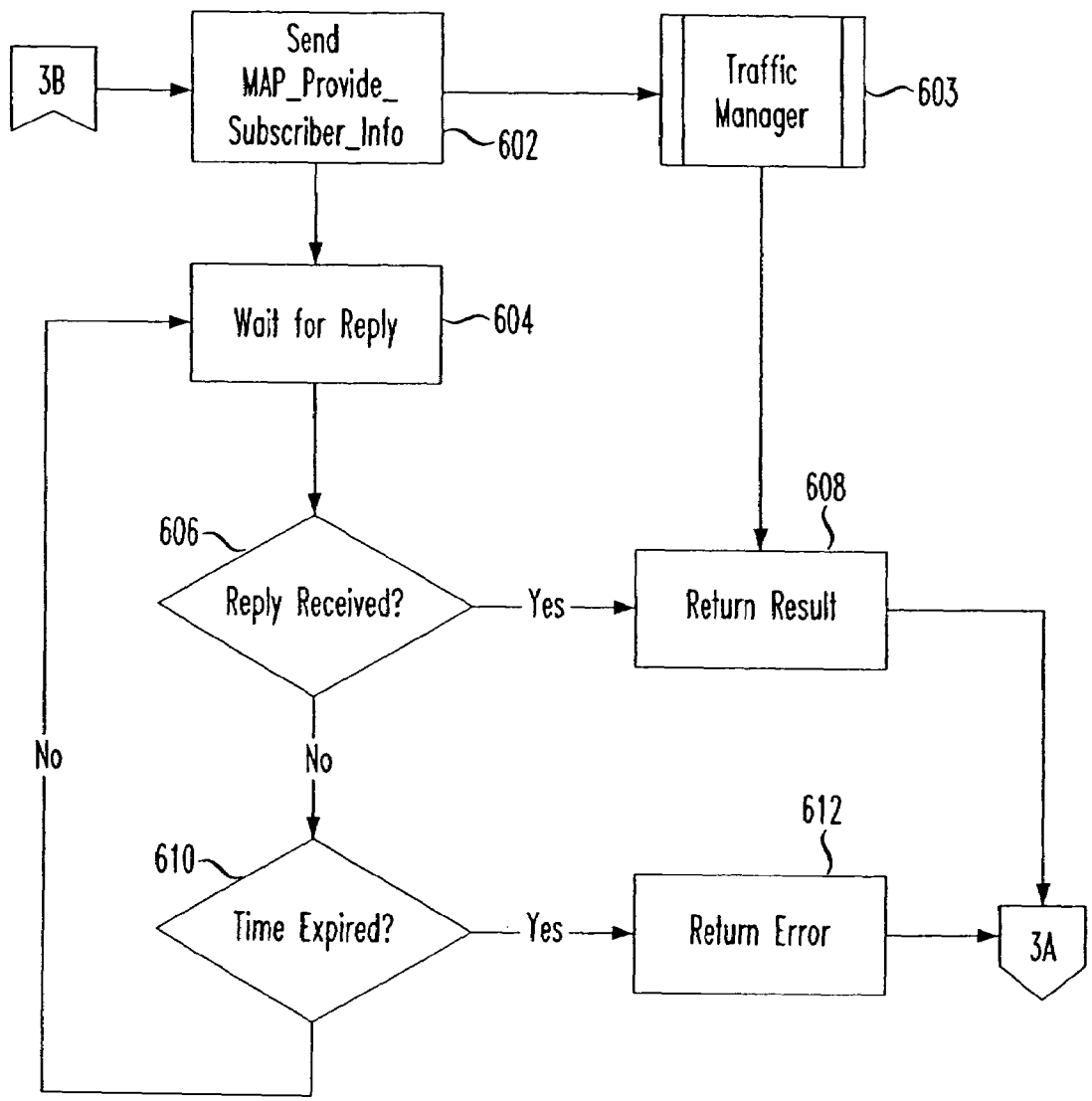
FIG. 6 shows exemplary scheme selection method 1 wherein a Telecommunication InterFace (TIF) determines that position information was previously cached, in accordance with the principles of the present invention.

FIG. 6 shows exemplary scheme selection method 1 wherein the Telecommunication InterFace (TIF) 102 determines that the position information was previously cached, in accordance with the principles of the present invention.

In particular, FIG. 6 shows the detailed procedure of method 1, which is used in the case that the Telecommunication InterFace (TIF) 102 determinates that the position information was cached before, and the serving Mobile Switch Center (MSC)/Serving GPRS Support Node (SGSN) supports the Mobile Application Part (MAP) version defined for Phase 2+.

In step 602 a signal MAP_Provide_Subscriber_Info is sent to a Traffic Manager 603, and in step 604 the TIF 102 waits for a reply. In step 606 it is determined whether a reply has been received by TIF 102, and if a reply has ben received a result is returned in step 608. If no reply has been received, it is determined in step 610 whether the timer has expired, and if the timer has expired, then an error is returned in step 612. If the timer has not expired, then the method returns to step 604.

Method 2

Figure 7:
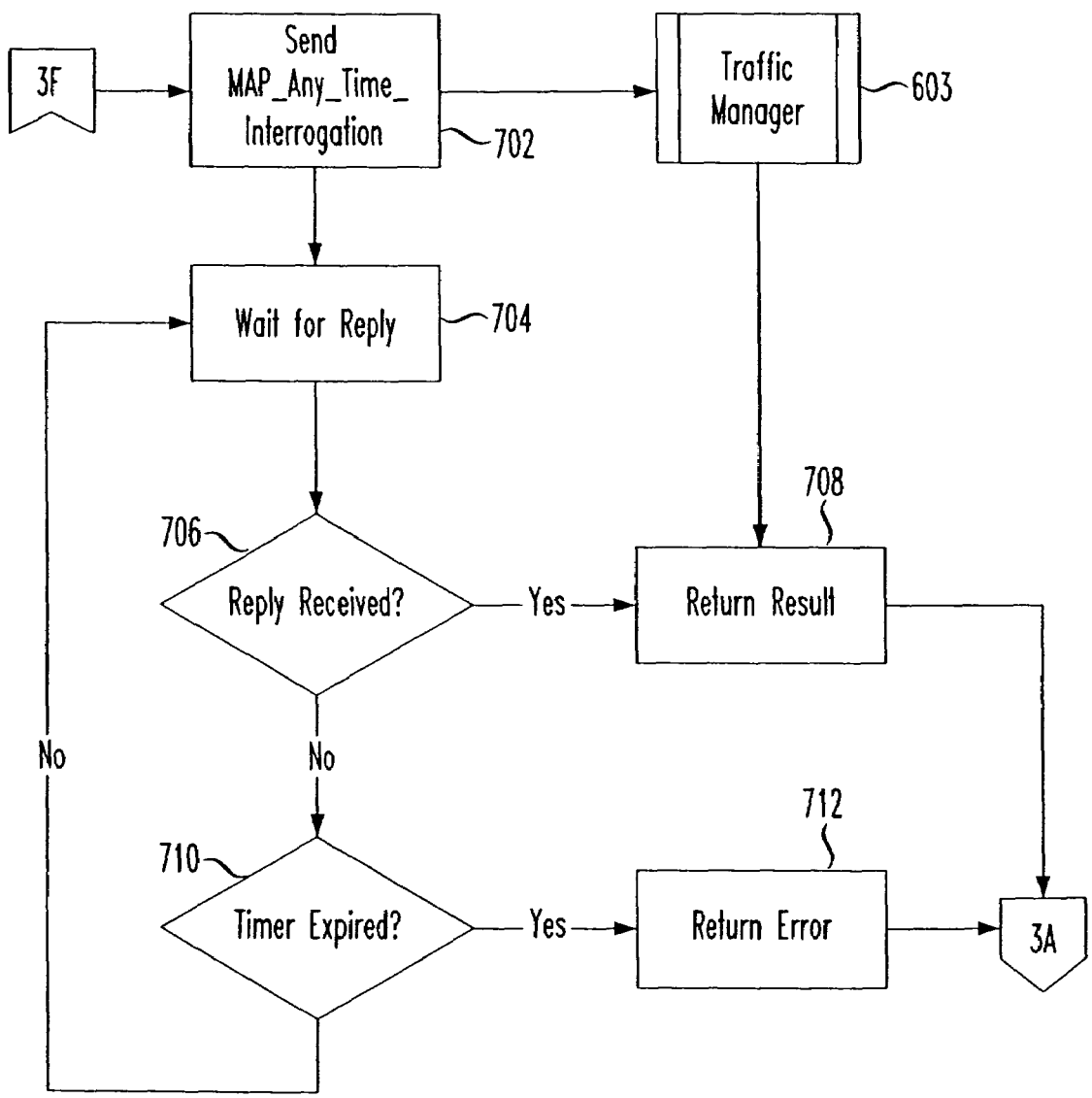
FIG. 7 shows exemplary scheme selection method 2 wherein position information of the target user equipment is not available, in accordance with the principles of the present invention.

FIG. 7 shows exemplary scheme selection method 2 wherein the position information of the target User Equipment is not available, in accordance with the principles of the present invention.

In particular, FIG. 7 shows the details of method 2, which is used in the case that the position information of the target User Equipment is not available, hence no information regarding the serving Mobile Switch Center (MSC)/Serving GPRS Support Node (SGSN) is available, and the request Type is LAST KNOWN.

In step 702 a MAP_Any_Time_Interrrogation signal is sent by the TIF 102 to the Traffic Manager 603, and in step 704 the TIF 102 waits for a reply. In step 706 it is determined whether a reply has been received, and if a reply has been received, then a result is returned in step 708. If a reply has not been received, then in step 710 it is determined whether the timer has expired, and if the timer has expired, then an error is returned in step 712. If the timer has not expired, then the method returns to step 704.

Method 3

FIG. 8 shows exemplary scheme selection method 3 wherein the position information of the target User Equipment is available from a cache database 403, in accordance with the principles of the present invention.

In particular, FIG. 8 shows the embodiment of method 3, which is used in the case that the position information of the target User Equipment is available from the cache database 403, which indicates the serving Mobile Switch Center (MSC)/Serving GPRS Support Node (SGSN) supports Mobile Application Part (MAP) version for Phase 2+, and the request type is CURRENT.

In step 802, a MAP_MT_Forward Short Message is sent by the TIF 102 to the Traffic Manager 603, and in step 804 the TIF 102 waits for a Short Message. In step 806 it is determined whether an error has been received, and if an error has been received the method jumps to step 818 to return an error. If no error has been received, then in step 808 a MAP_Provide_Subscriber_Info signal is sent, and in step 810 the TIF 102 waits for a reply. In step 812 it is determined whether a reply has been received, and if a reply has been received, then a result is returned in step 814. If no reply has been received, then in step 816 it is determined whether the timer has expired, and if the timer has expired, then in step 818 an error is returned. If the timer has not expired, then the method returns to step 810.

Method 4

Figure 9:
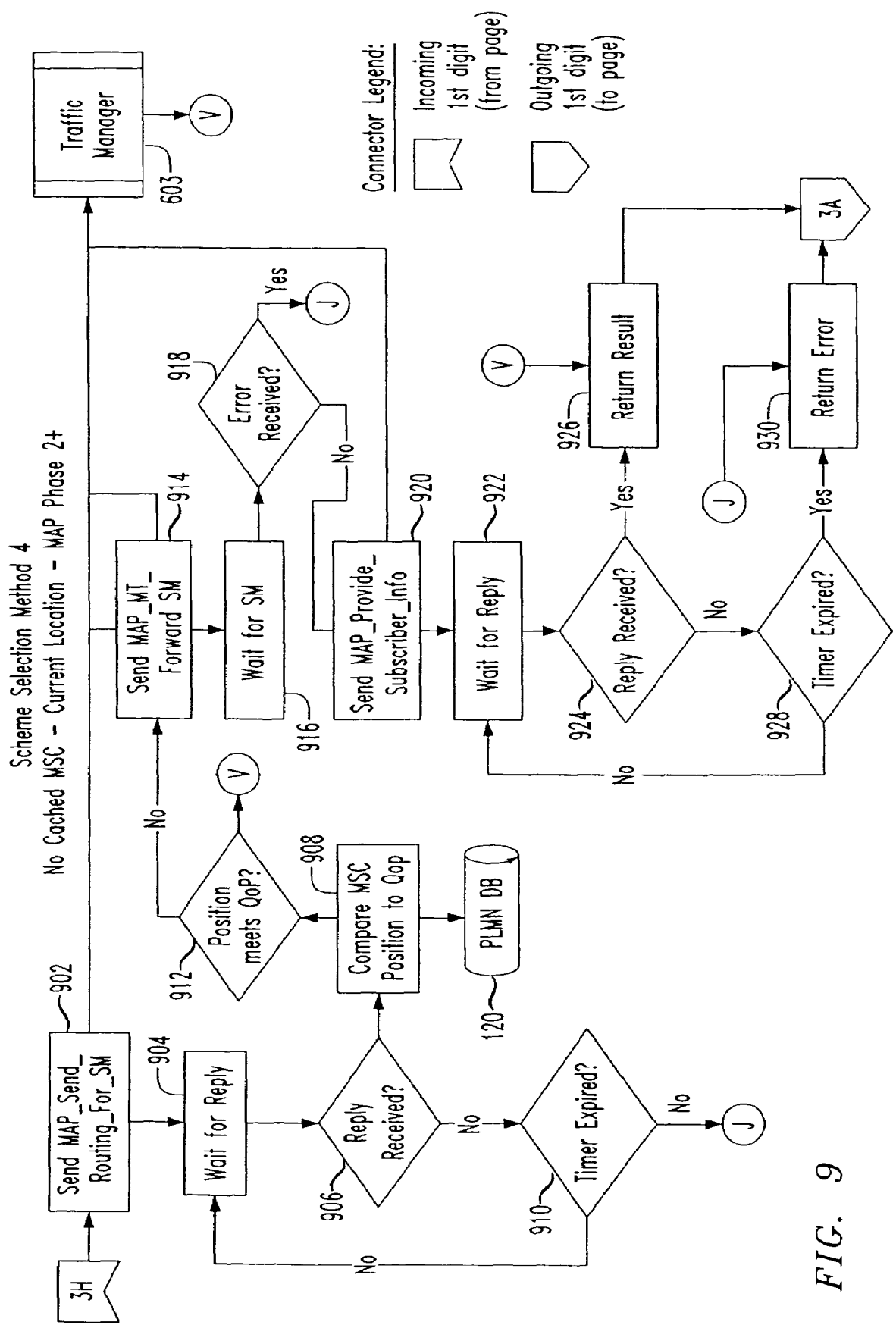
FIG. 9 shows exemplary scheme selection method 4 wherein no cached position information regarding a target user equipment is available, in accordance with the principles of the present invention.

FIG. 9 shows exemplary scheme selection method 4 wherein no cached position information regarding the target User Equipment is available, in accordance with the principles of the present invention.

In particular, FIG. 9 shows method 4, which is used in the case that no cached position information of the target User Equipment is available and the request Type is CURRENT. In this case, Telecommunication InterFace (TIF) 102 queries the Home Location Register (HLR) for the serving Mobile Switch Center (MSC) using MAP_Send_Routing_Info_For_SM, and then sends a null short message to the target User Equipment to refresh it location information in the serving Mobile Switch Center (MSC)/Visitor Location Register (VLR).

If the Mobile Terminated (MT) short message delivery is successful, the Telecommunication InterFace (TIF) 102 then initiates MAP_Provide_Subscriber_Info to retrieve the location information of the target User Equipment.

In step 902, a MAP_Send_Routing_For_SM signal is sent by the TIF 102 to the Traffic Manager 603, and in step 904 the TIF 102 waits for a reply. In step 906 it is determined whether a reply has been received, and if a reply has been received, then the MSC position is compared to the Quality of Position (QoP) in step 908 from the PLMN database 120. If a reply has not been received, then it is determined whether the timer has expired in step 910, and if the timer has expired then an error is returned in step 930. If the timer has not expired, then the method returns to step 904. On completion of step 908, it is determined whether the position meets a desired Quality of Position (QoP) in step 912, and if the position meets the desired QoP, then a result is returned in step 926. If the position does not meet the desired QoP, then a MAP_MT_Forward Short Message is sent by the TIF 102 to the Traffic Manager 603 in step 914, and the TIF 102 waits for a reply in step 916. In step 918 it is determined whether an error has been received, and if an error has been received, then an error is returned in step 930. If an error has not been received, then a MAP_Provide_Subscriber_Info signal is sent by the TIF 102 in step 920, and the TIF 102 waits for a reply in step 922. In step 924 it is determined whether a reply has been received, and if a reply has been received, then in step 926 a result is returned. If no reply has been received, then in step 928 it is determined whether the timer has expired, If the timer has expired, then in step 930 an error is returned, and if the timer has not expired, then the method returns to step 922.

Method 5

Figure 10:
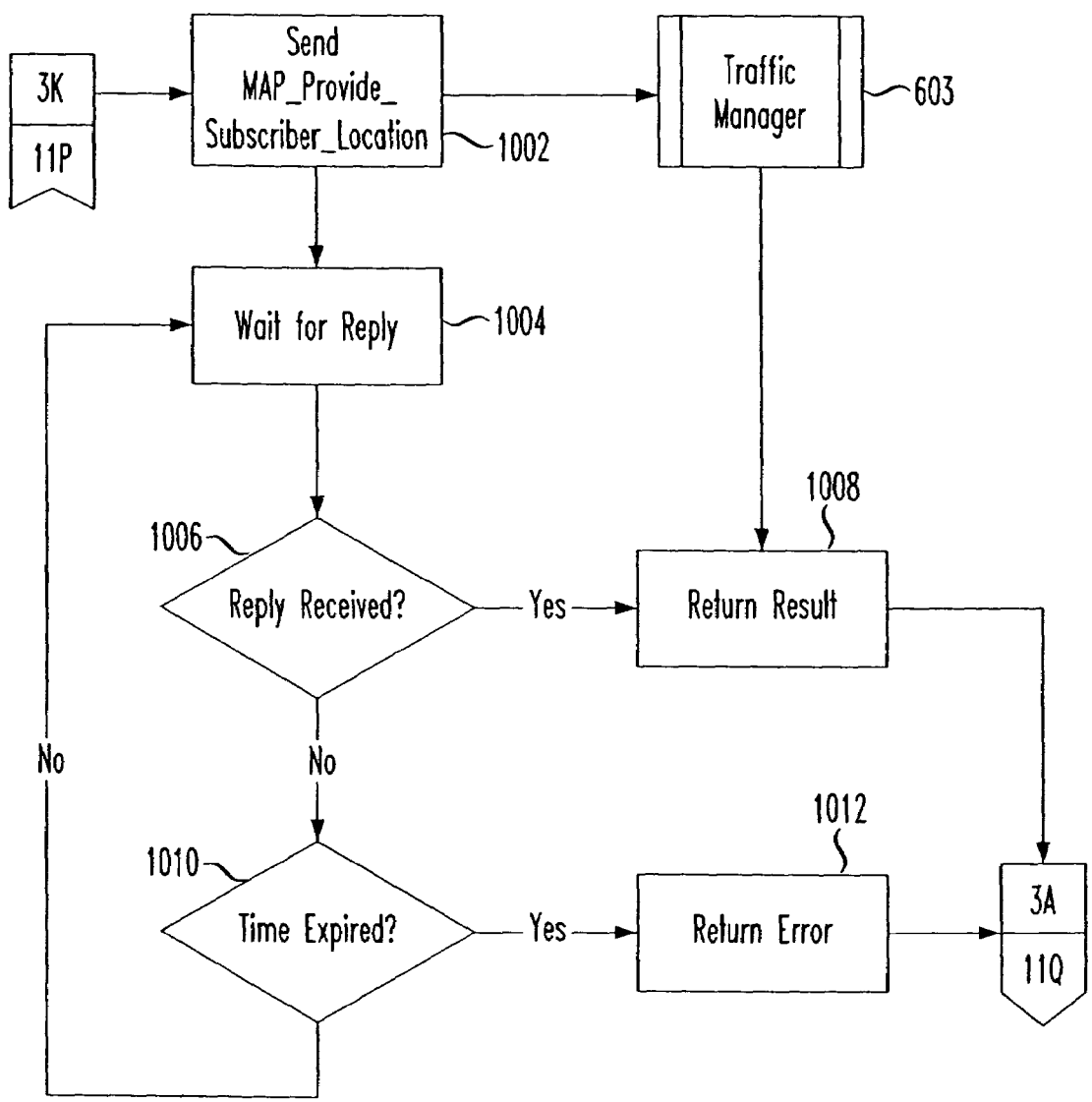
FIG. 10 shows exemplary scheme selection method 5 wherein position information is available in a cache database, in accordance with the principles of the present invention.

FIG. 10 shows exemplary scheme selection method 5 wherein position information is available in the cache database 403, in accordance with the principles of the present invention.

In particular, FIG. 10 shows the procedure details of method 5, which is used in the case that the position information is available in the cache database 403, indicating that the serving Mobile Switch Center (MSC)/Serving GPRS Support Node (SGSN) supports Release 99 Mobile Application Part (MAP) version.

In step 1002 a MAP_Provide_Subscriber_Location signal is sent by the TIF 102 to the Traffic Manager 603, and in step 1004 the TIF 102 waits for a reply. In step 1006 it is determined whether a reply has been received, and if a reply has been received, then in step 1008 a result is returned. If no reply has been received, then in step 1010 it is determined whether the timer has expired, and if the timer has expired, then in step 1012 an error is returned. If the timer has not expired, then the method returns to step 1004.

Method 6

Figure 11:
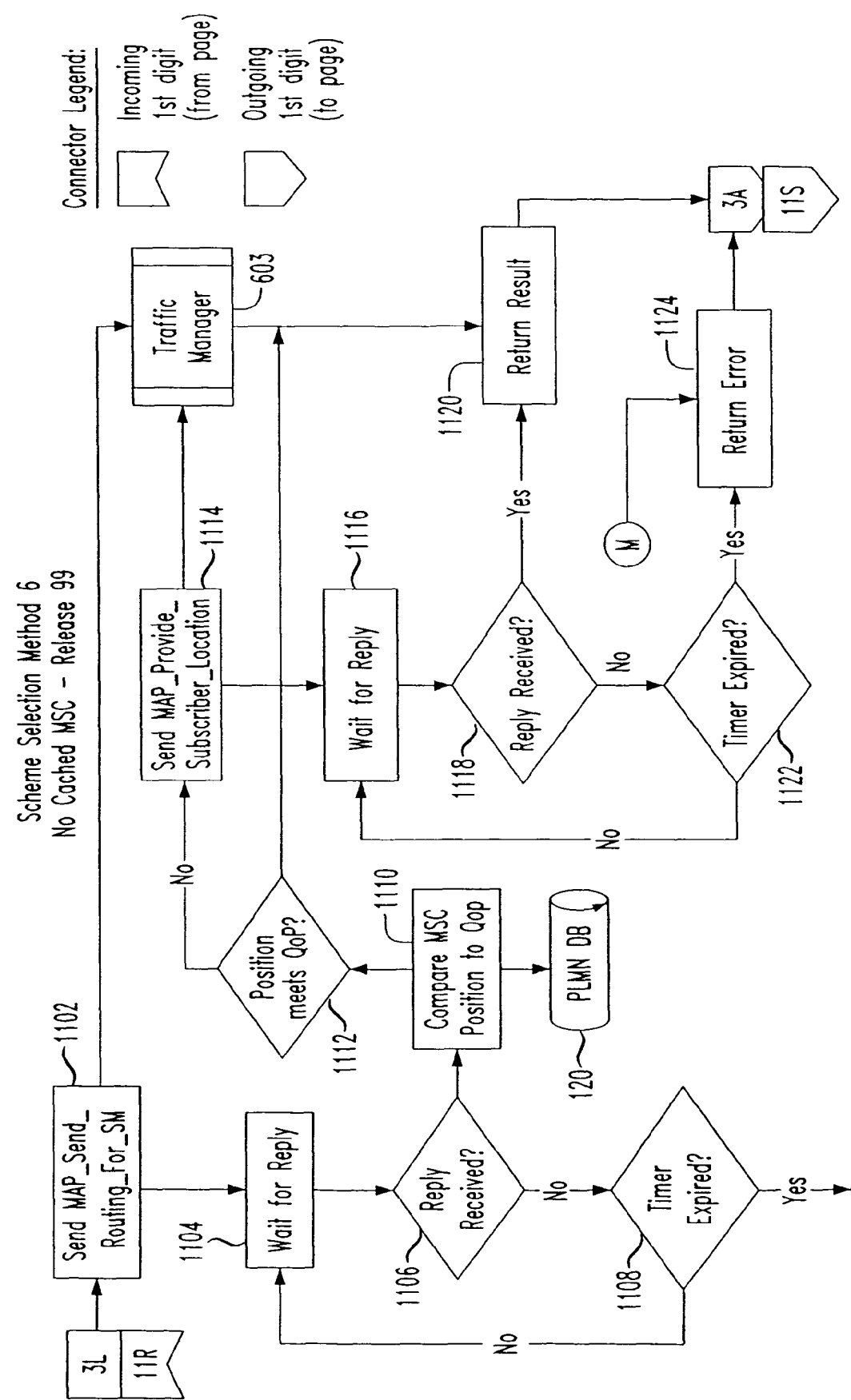
FIG. 11 shows exemplary scheme selection method 6 wherein no cached position information regarding a target subscriber is available, in accordance with the principles of the present invention.

FIG. 11 shows exemplary scheme selection method 6 wherein no cached position information regarding the target subscriber is available, in accordance with the principles of the present invention.

In particular, FIG. 11 shows method 6, which is used in the case that no cached position information of the target subscriber is available, the Telecommunication InterFace (TIF) 102 uses Release 99 Mobile Application Part (MAP) version to communicate with the various network components. Firstly the Telecommunication InterFace (TIF) 102 initiates MAP_Send_Routing_Info_For_LCS (LCS is short for LoCation Services) to retrieve the serving Mobile Switch Center (MSC)/Serving GPRS Support Node (SGSN)-number of the target User Equipment from the Home Location Register (HLR). If the original request asks for the location information higher than Mobile Switch Center (MSC)/Serving GPRS Support Node (SGSN) level, the Telecommunication InterFace (TIF) 102 uses MAP_Provide_Subscriber_Location to retrieve the location information of the target User Equipment from the Mobile Switch Center (MSC)/Serving GPRS Support Node (SGSN).

In step 1102 a MAP_Send_Routing_For_LCS signal is sent by the TIF 102 to the Traffic Manager 603, and in step 1104 the TIF 102 waits for a reply. It is determined in step 1106 whether a reply has been received, and if a reply has been received the method proceeds to step 1110. If no reply has been received, then in step 1108 it is determined whether the timer has expired, and if the timer has expired, then an error is returned in step 1124. If the timer has not expired, then the method returns to step 1104. In step 1110 the MSC position is compared to the desired Quality of Position (QoP), by means of the PLMN database 120, and in step 1112 it is determined whether the position meets the desired QoP. If the position meets the desired QoP, then a result is returned in step 1120, and if the position does not meet the desired QoP, then a Send_MAP_Provide_Subscriber_Location signal is sent in step 1114 and the TIF 102 waits for a reply in step 1116. In step 1118 it is determined whether a reply has been received, and if a reply has been received, then in step 1120 a result is returned. If a reply has not been received, hen in step 1122 it is determined whether the timer has expired, and if the timer has expired, then in step 1124 an error is returned. If the timer has not expired, then the method returns to step 1116.

Method 7

Figure 12:
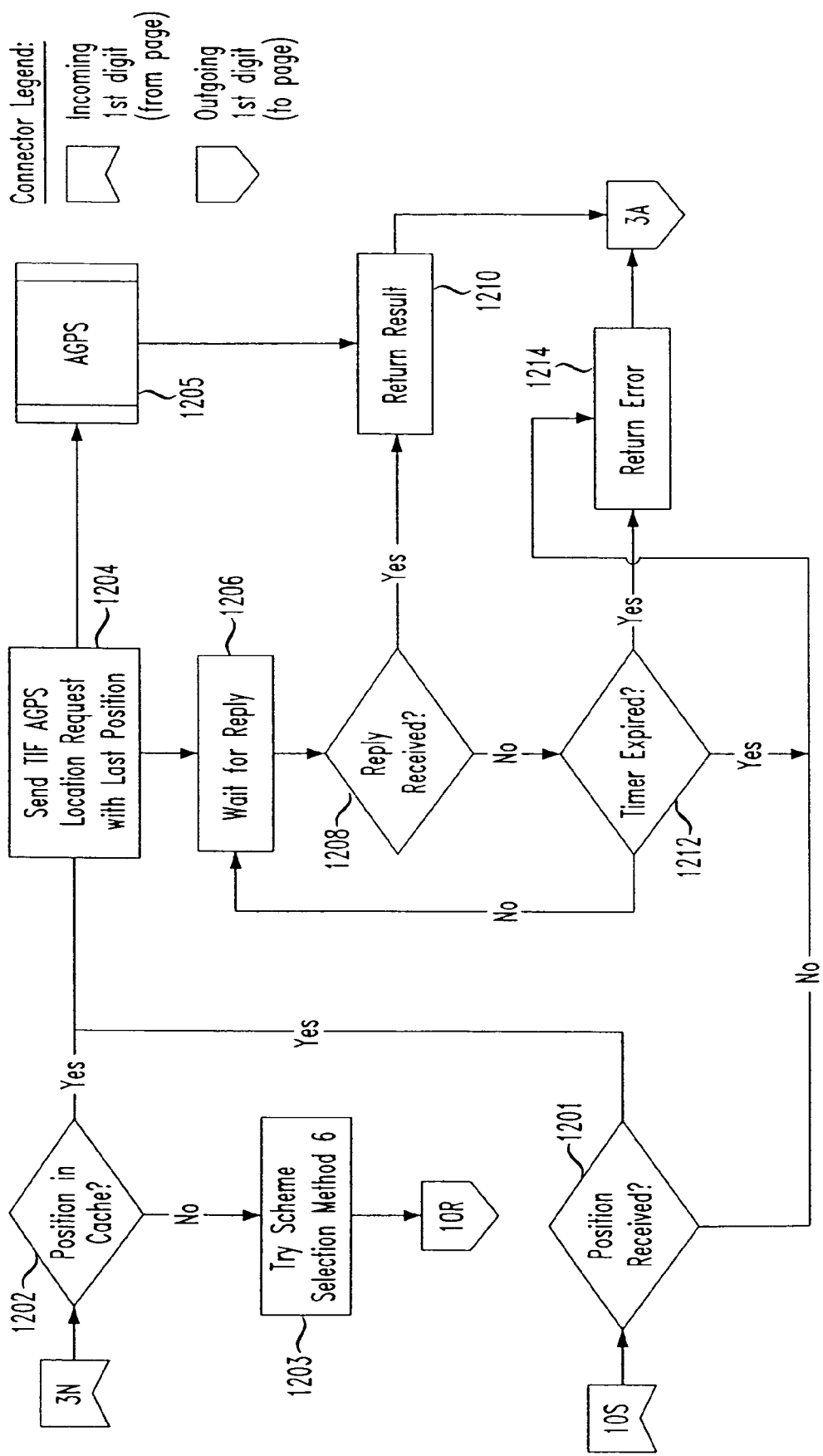
FIG. 12 shows exemplary scheme selection method 7 wherein an Assisted Global Positioning Satellite (AGPS) system mechanism is used to retrieve accurate position information regarding a target user equipment, in accordance with the principles of the present invention.

FIG. 12 shows exemplary scheme selection method 7 wherein an Assisted Global Positioning Satellite system (AGPS) mechanism is used to retrieve accurate position information regarding the target User Equipment, in accordance with the principles of the present invention.

In particular, FIG. 12 shows method 7, which uses Assisted GPS (AGPS) mechanism to retrieve the accurate position of the target User Equipment. In order to let the target User Equipment measure its position, the XLP needs to provide some assistance data to the target User Equipment. The assistance data is built upon the location information of the serving network element. Therefore, if no cached position information of the target User Equipment is available (or it is too old), the Telecommunication InterFace (TIF) 102 will initiate Method 6 to retrieve the necessary information from the core network.

In step 1202, it is determined whether the position is stored in cache 403, and if the position is not stored in cache 403, then the method exits in step 1203 and Scheme Selection Method 6 is tried (see FIG. 11). If the position is stored in cache 403, or if a position has been determined to have been received in step 1201, then in step 1204 a location request is sent with the last position to AGPS unit 1205, and in step 1206 the TIF 102 waits for a reply. In step 1208 it is determined whether a reply has been received, and if a reply has been received, then in step 1210 a result is returned. If a reply has not been received, then in step 1212 it is determined whether the timer has expired, and if the timer has expired, or if no position was received in step 1201, then in step 1214 an error is returned. If the timer has not expired, then the method returns to step 1206.

Method 8

Figure 13:
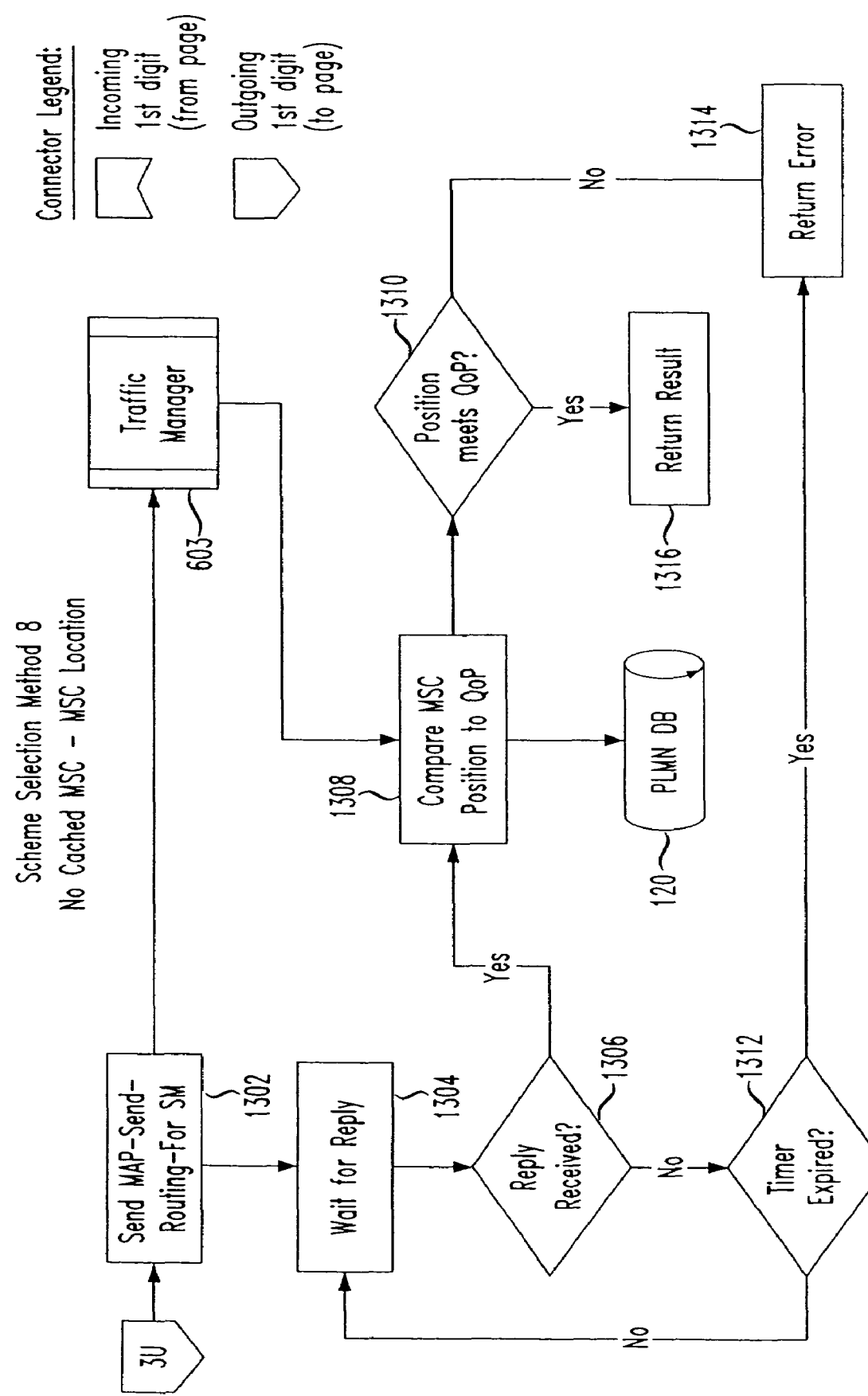
FIG. 13 shows exemplary scheme selection method 8 wherein cached position information is available, in accordance with the principles of the present invention.
Figure 16:
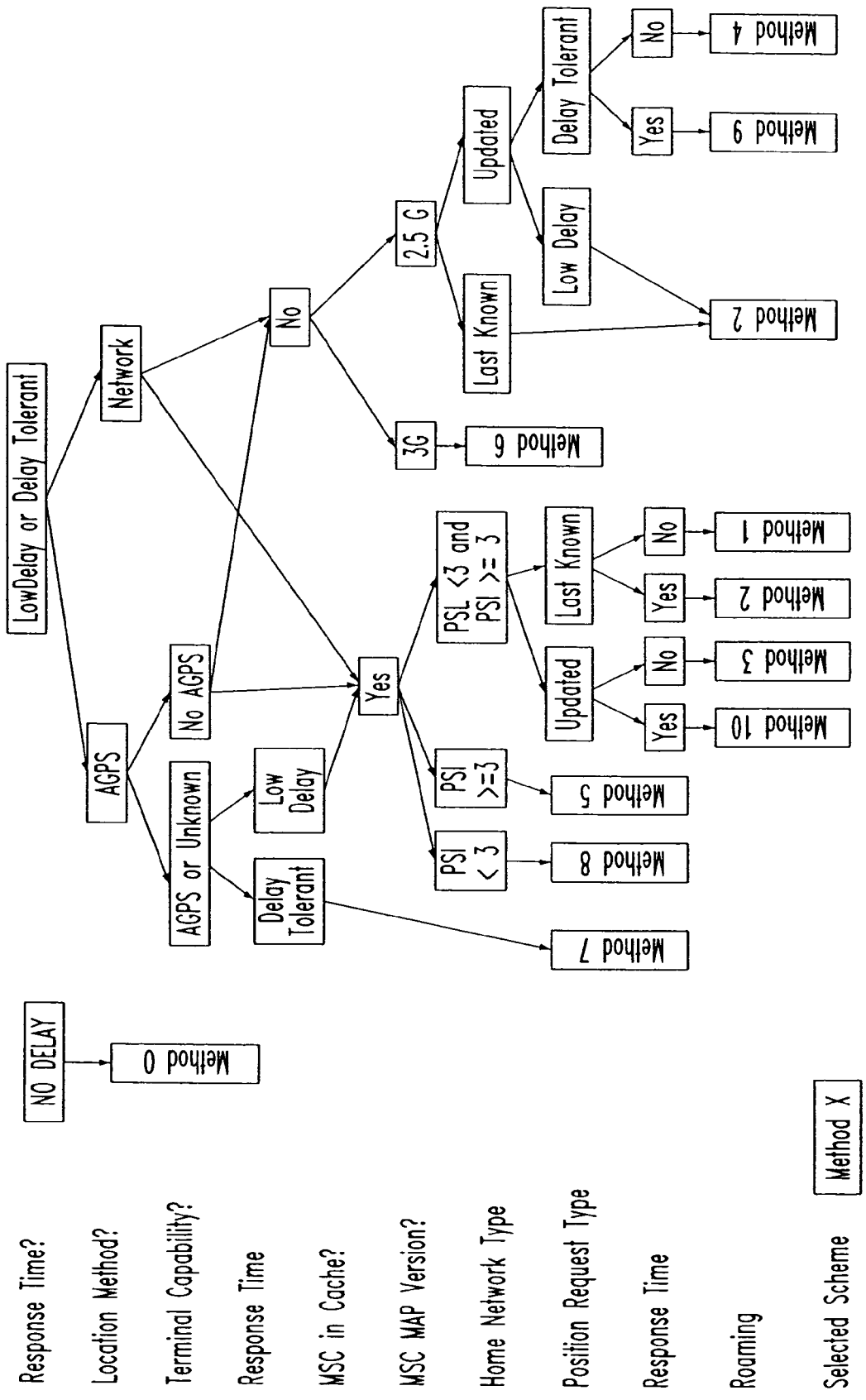
FIG. 16 shows a simplified scheme selection decision tree for the embodiment shown in FIG. 14.
Figure 17:
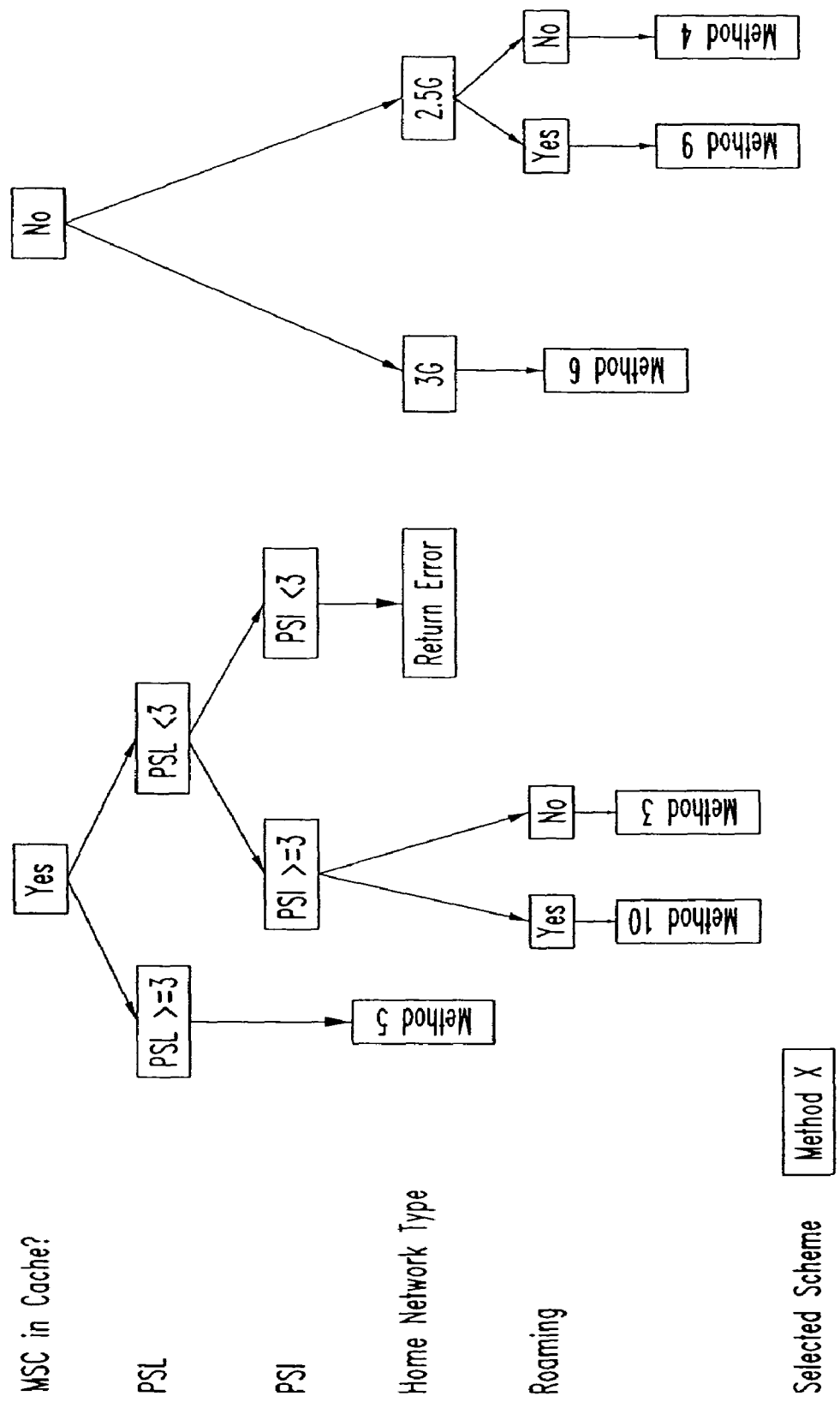
FIGS. 17 and 18 show an exemplary decision tree for handling an assisted GPS coarse position request.
Figure 18:
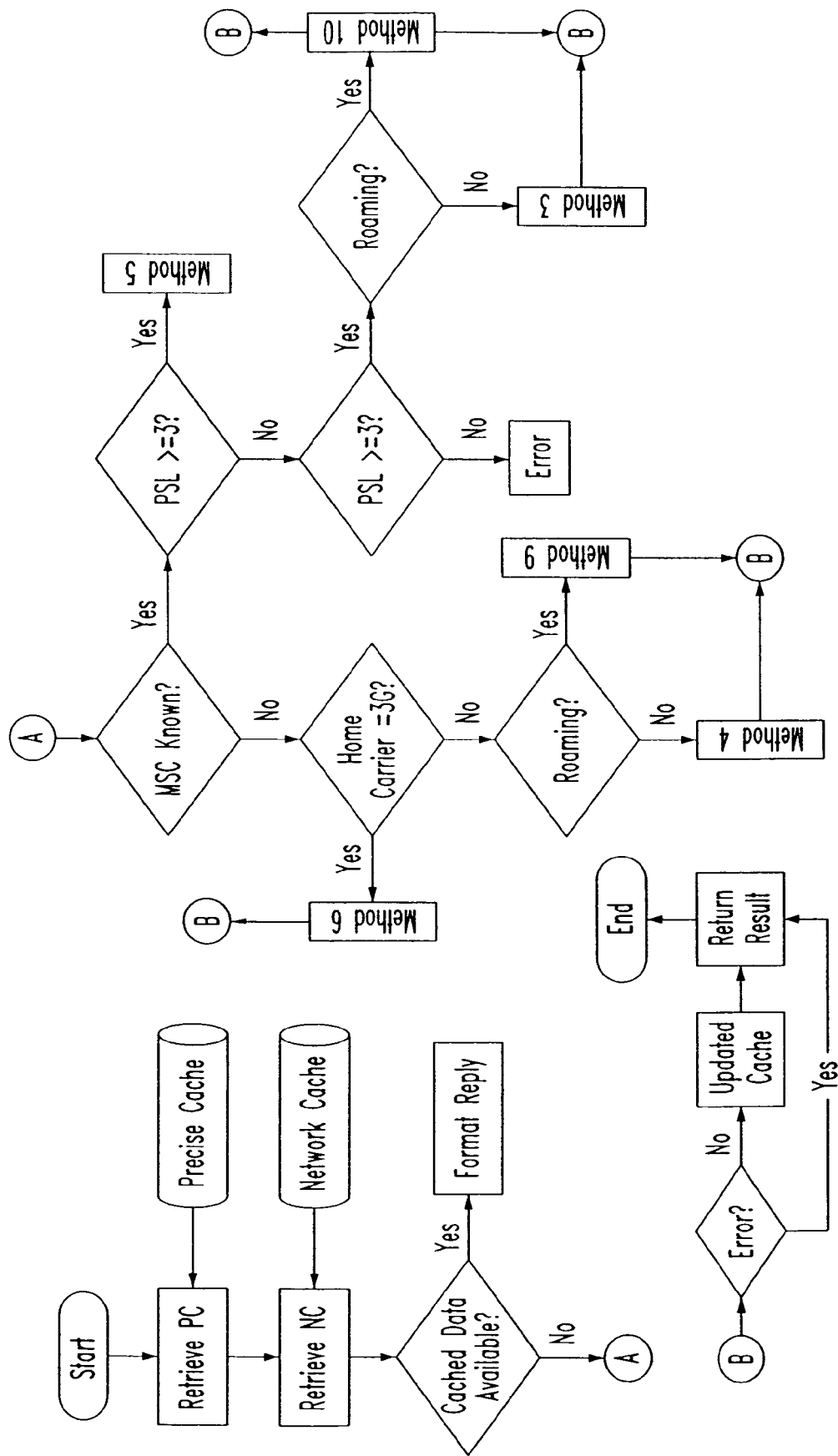
Figure 19:
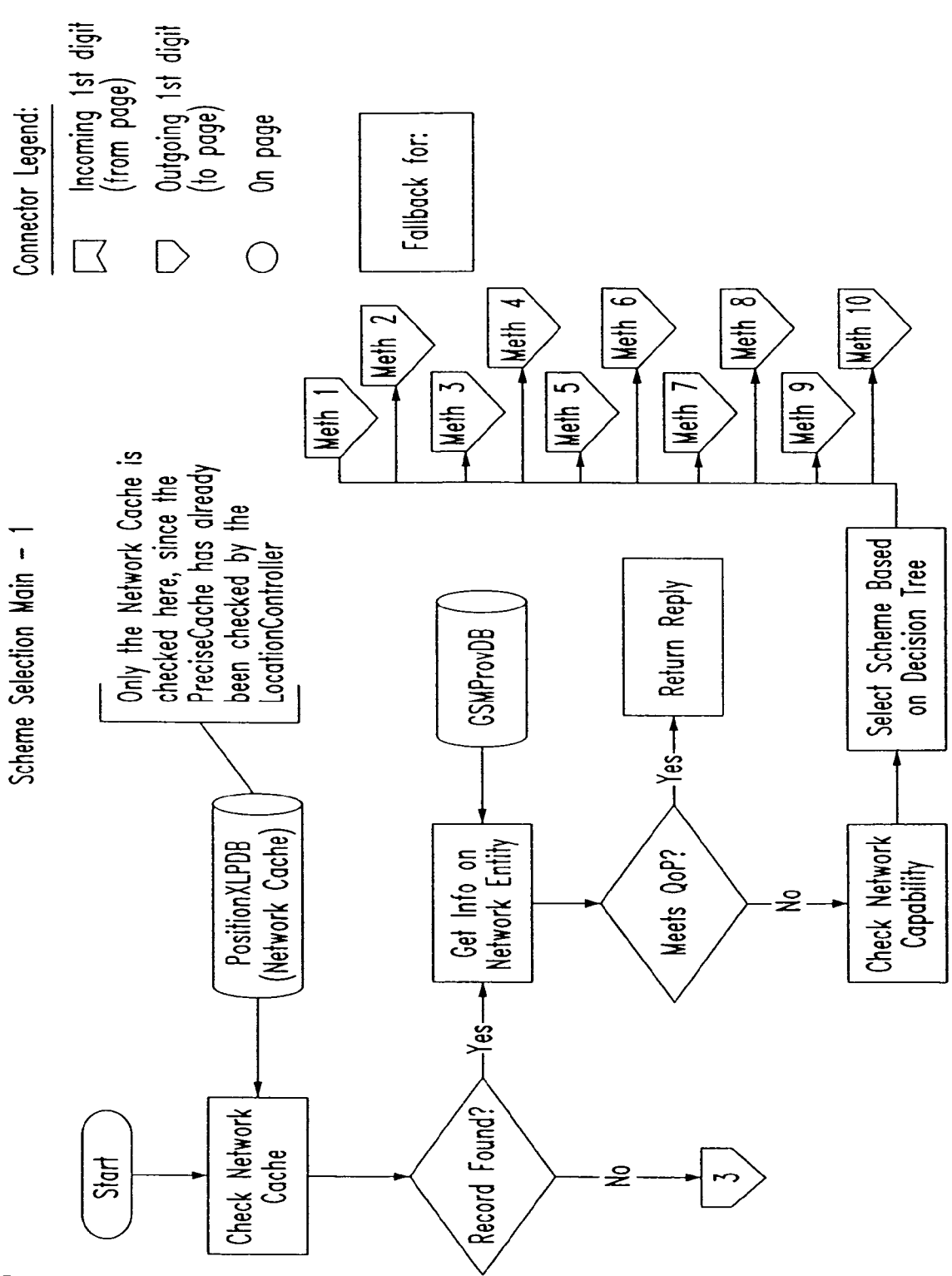
FIGS. 19–21 show an exemplary main scheme selection routine of the embodiment shown in FIG. 14.
Figure 20:
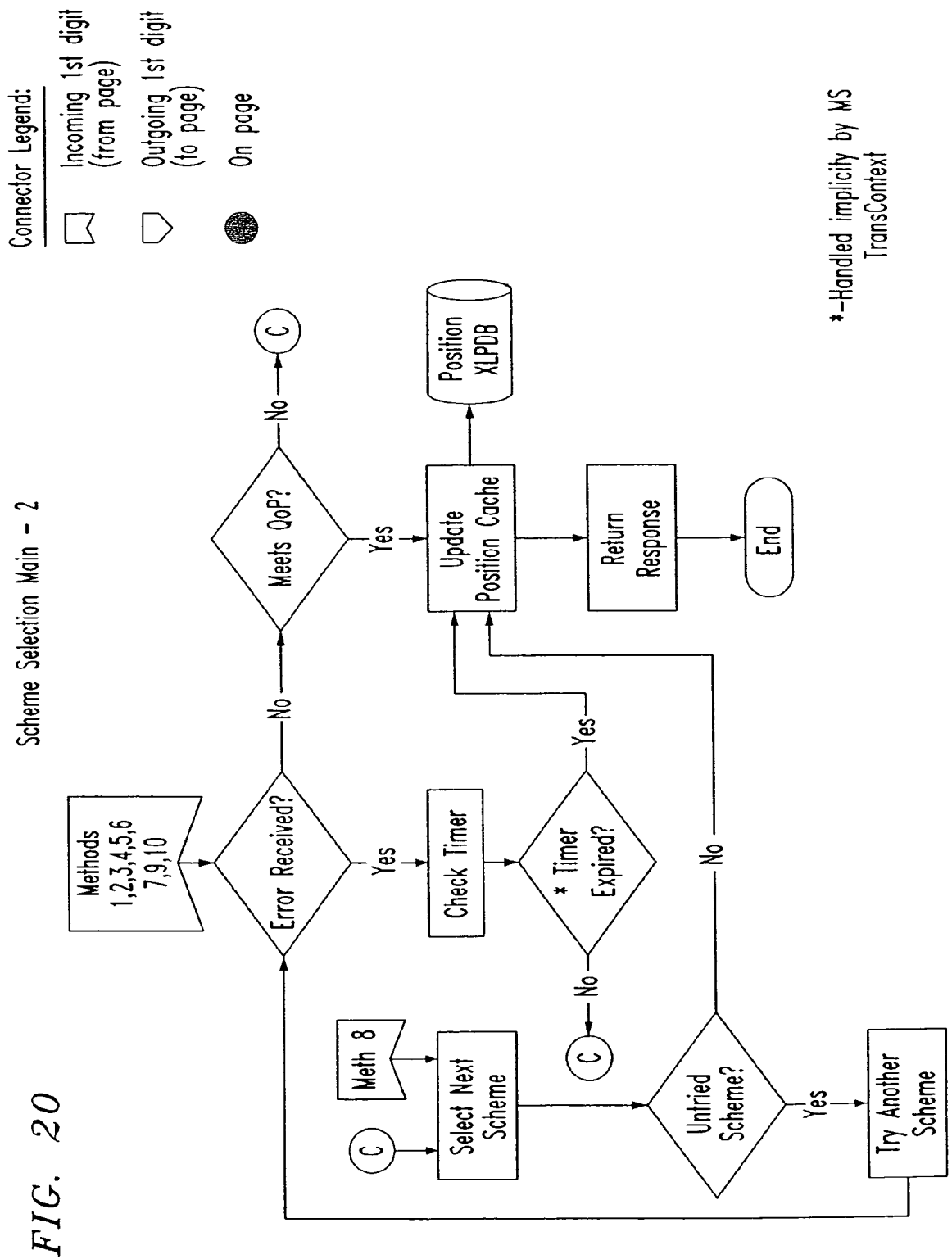
Figure 21:
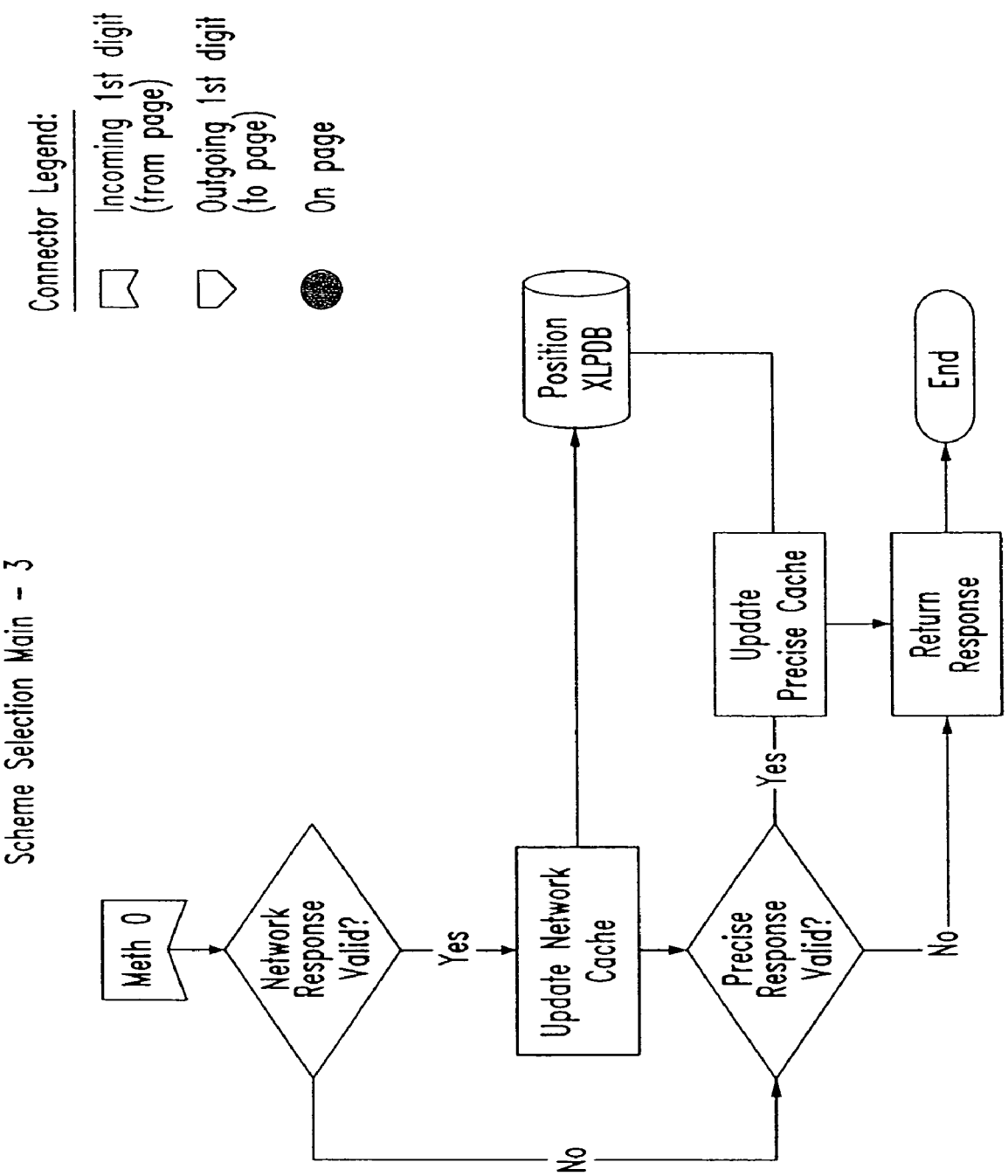
Figure 22:
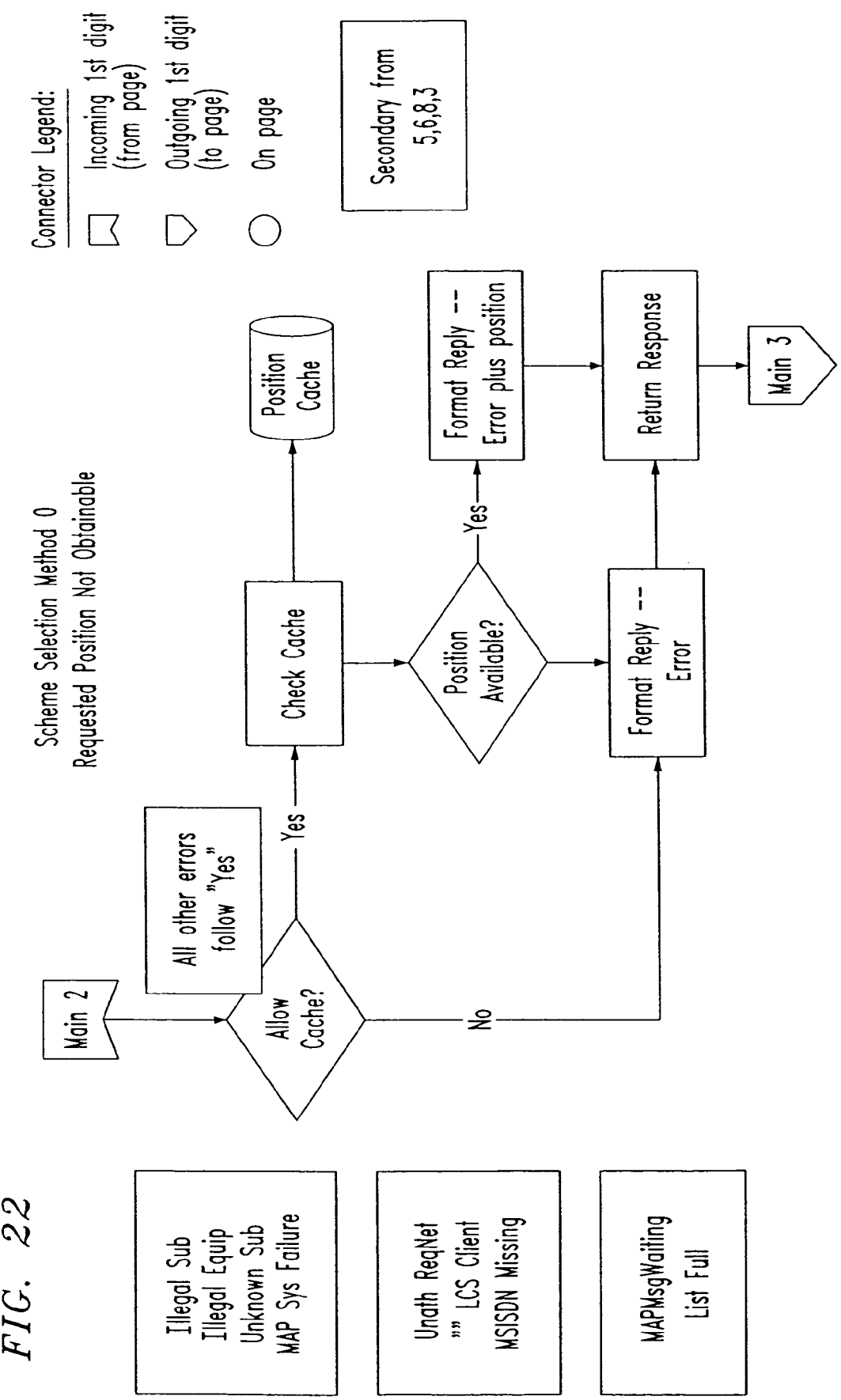
FIG. 22 shows an exemplary routine for method 0 of the scheme selection where the requested position is not obtainable.
Figure 23:
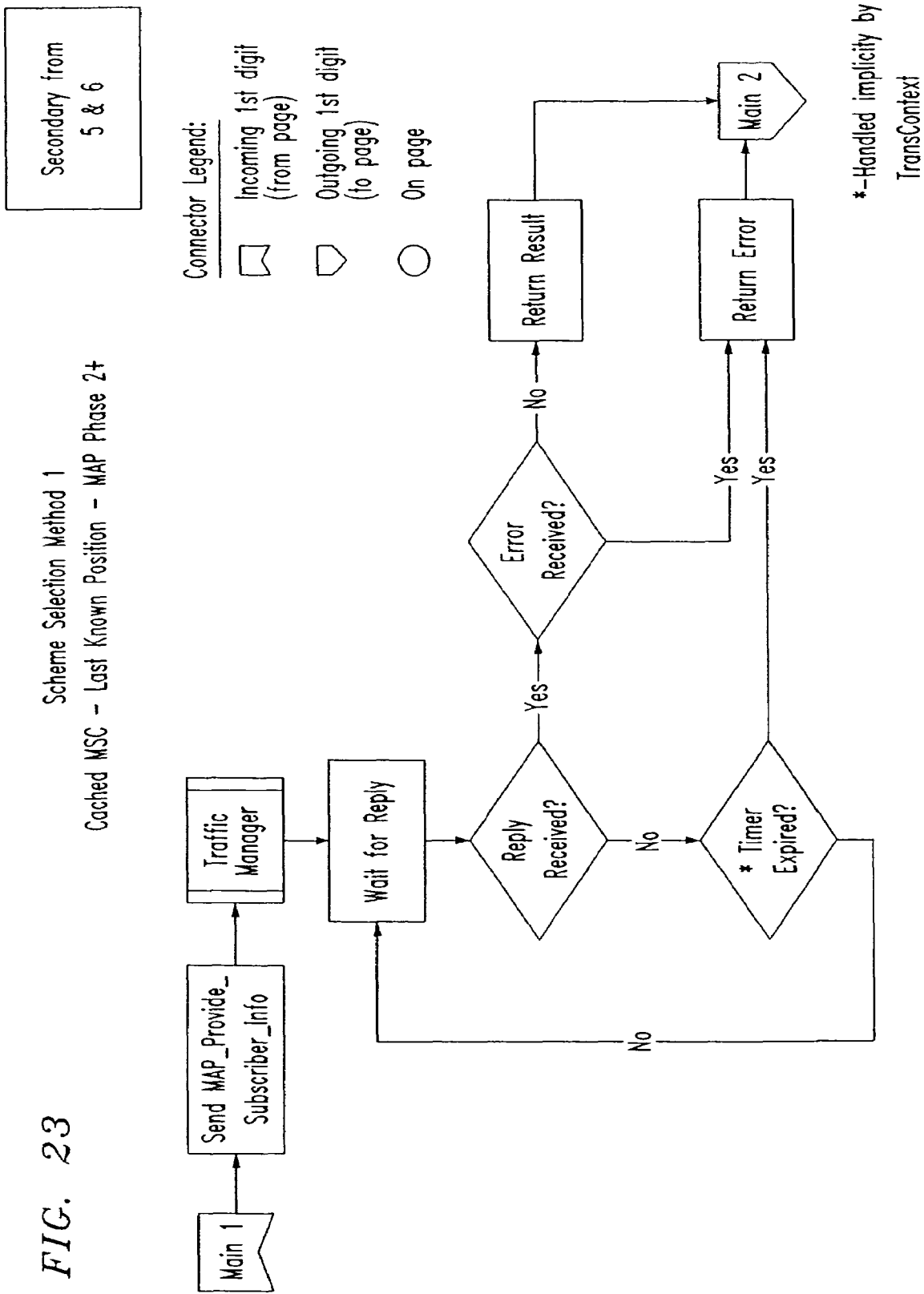
FIG. 23 shows an exemplary routine for method 1 of the scheme selection for cached MSC-last known position-MAP phase 2+.
Figure 24:
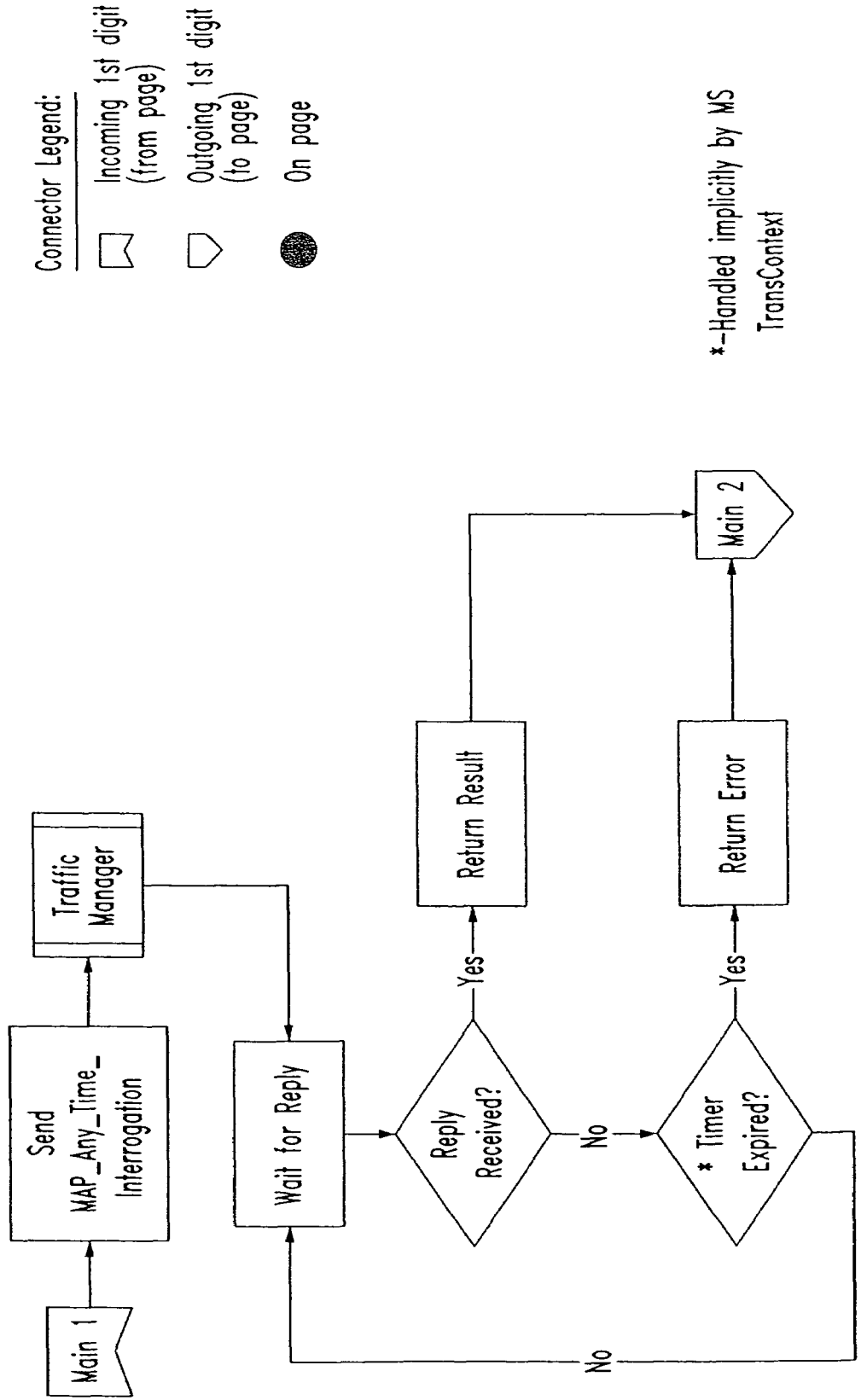
FIG. 24 shows an exemplary routine for method 2 of the scheme selection for no cached MSC-last known position-MAP phase 2+.
Figure 25:
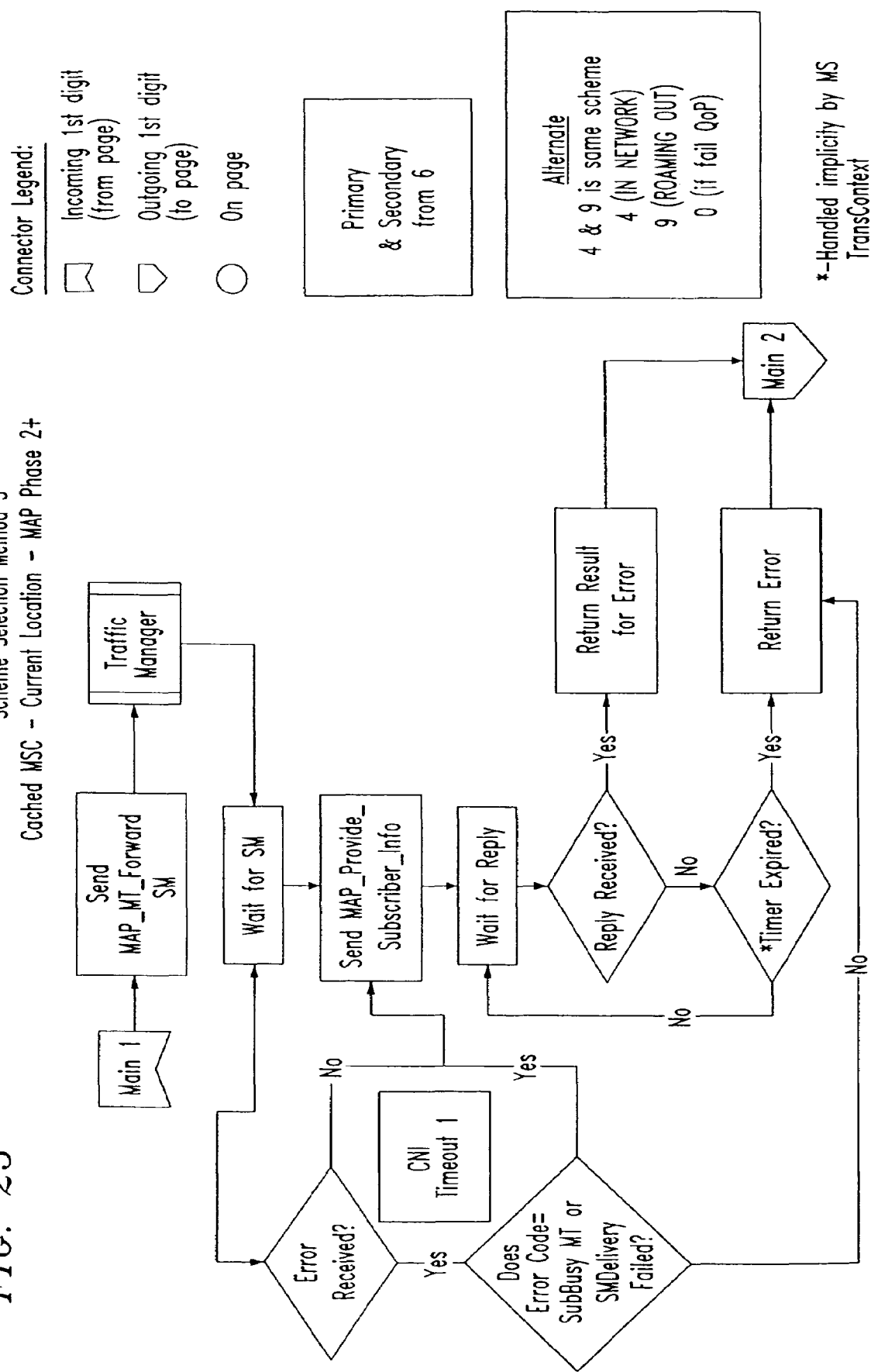
FIG. 25 shows an exemplary routine for method 3 of the scheme selection for cached MSC-current location-MAP phase 2+.
Figure 26:
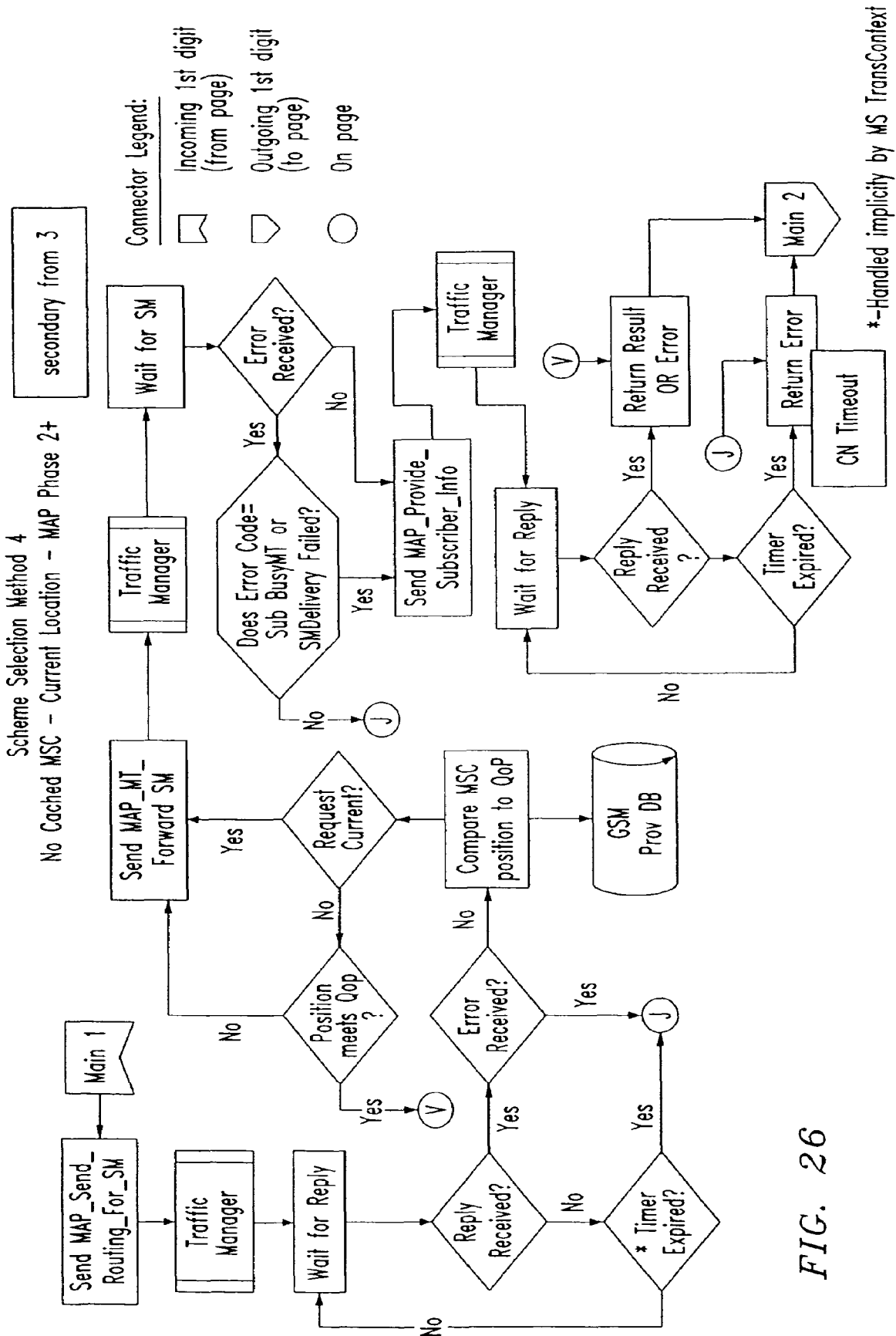
FIG. 26 shows an exemplary routine for method 4 of the scheme selection for no cached MSC-current location-MAP phase 2+.
Figure 27:
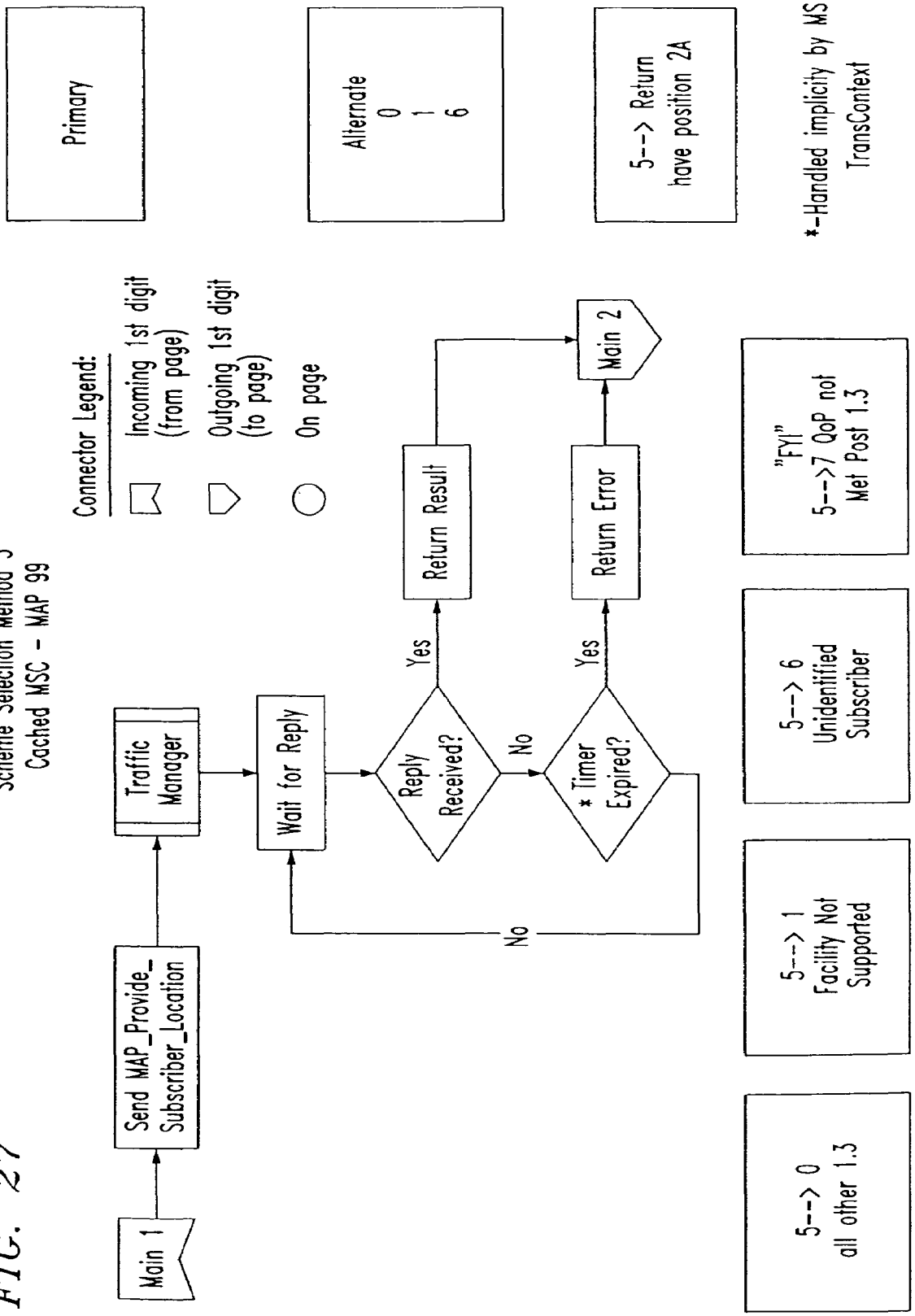
FIG. 27 shows an exemplary routine for method 5 of the scheme selection for cached MSC-MAP 99.
Figure 28:
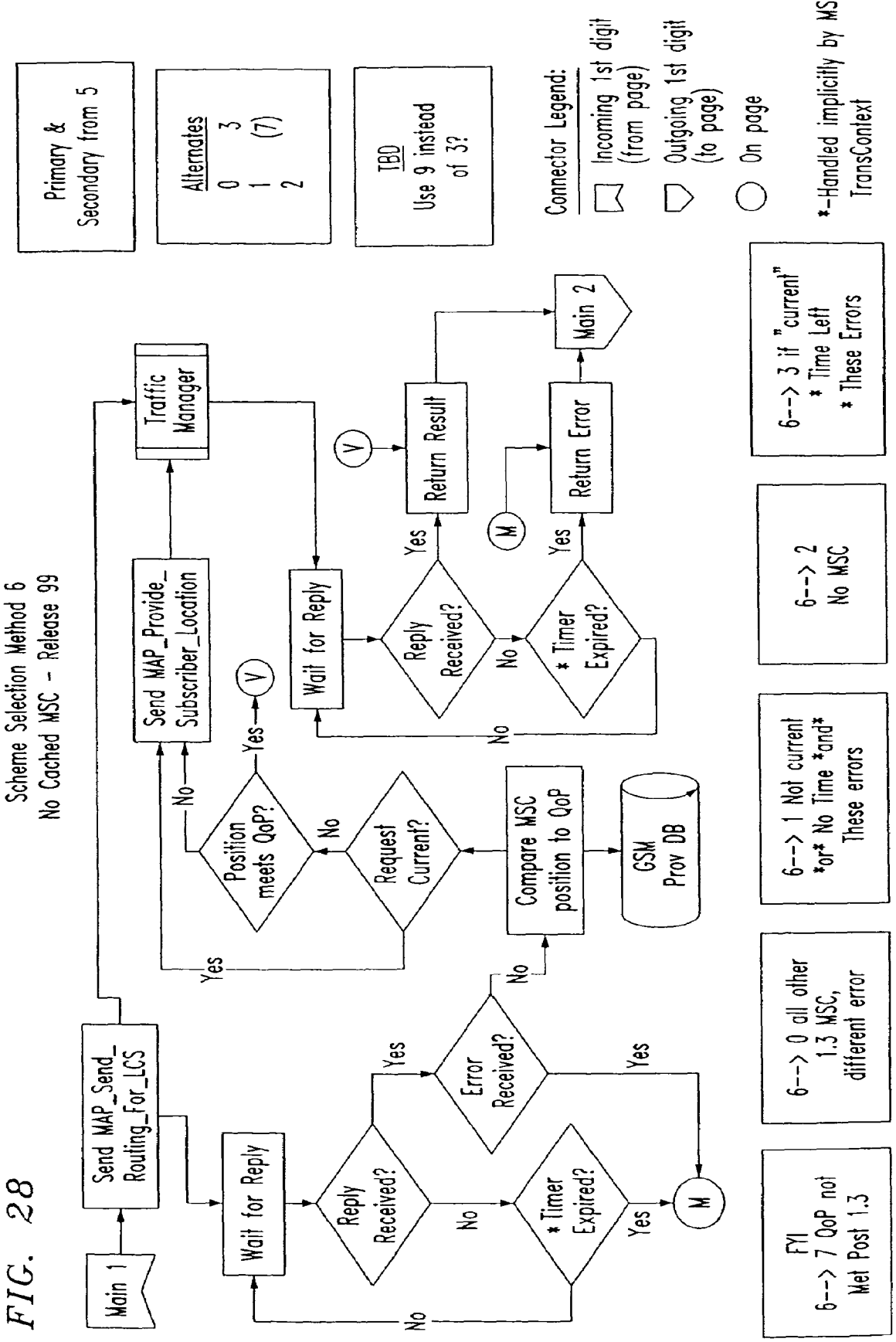
FIG. 28 shows an exemplary routine for method 6 of the scheme selection for no cached MSC-release 99.
Figure 29:
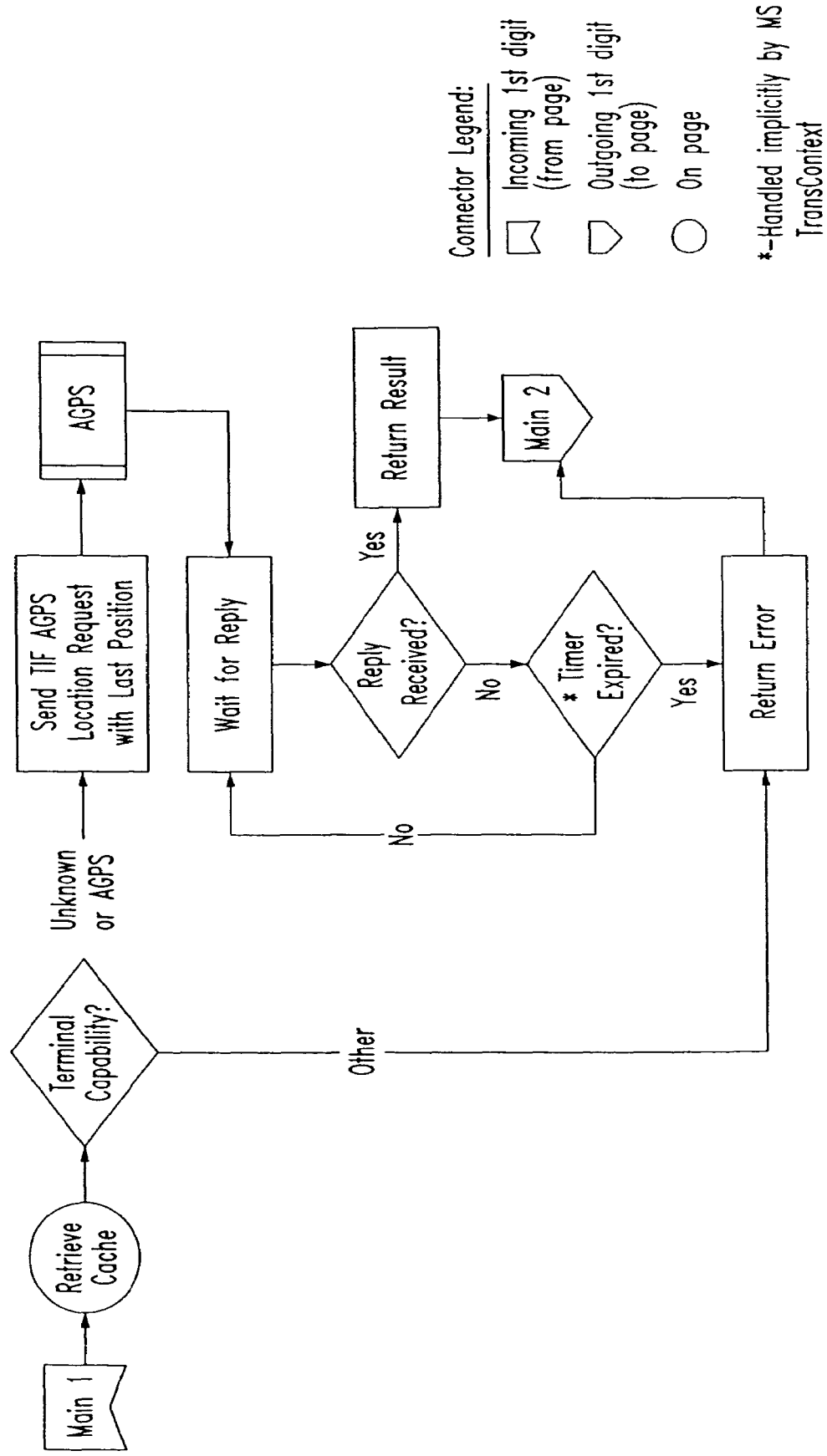
FIG. 29 shows an exemplary routine for method 7 of the scheme selection for assisted GPS location.
Figure 30:
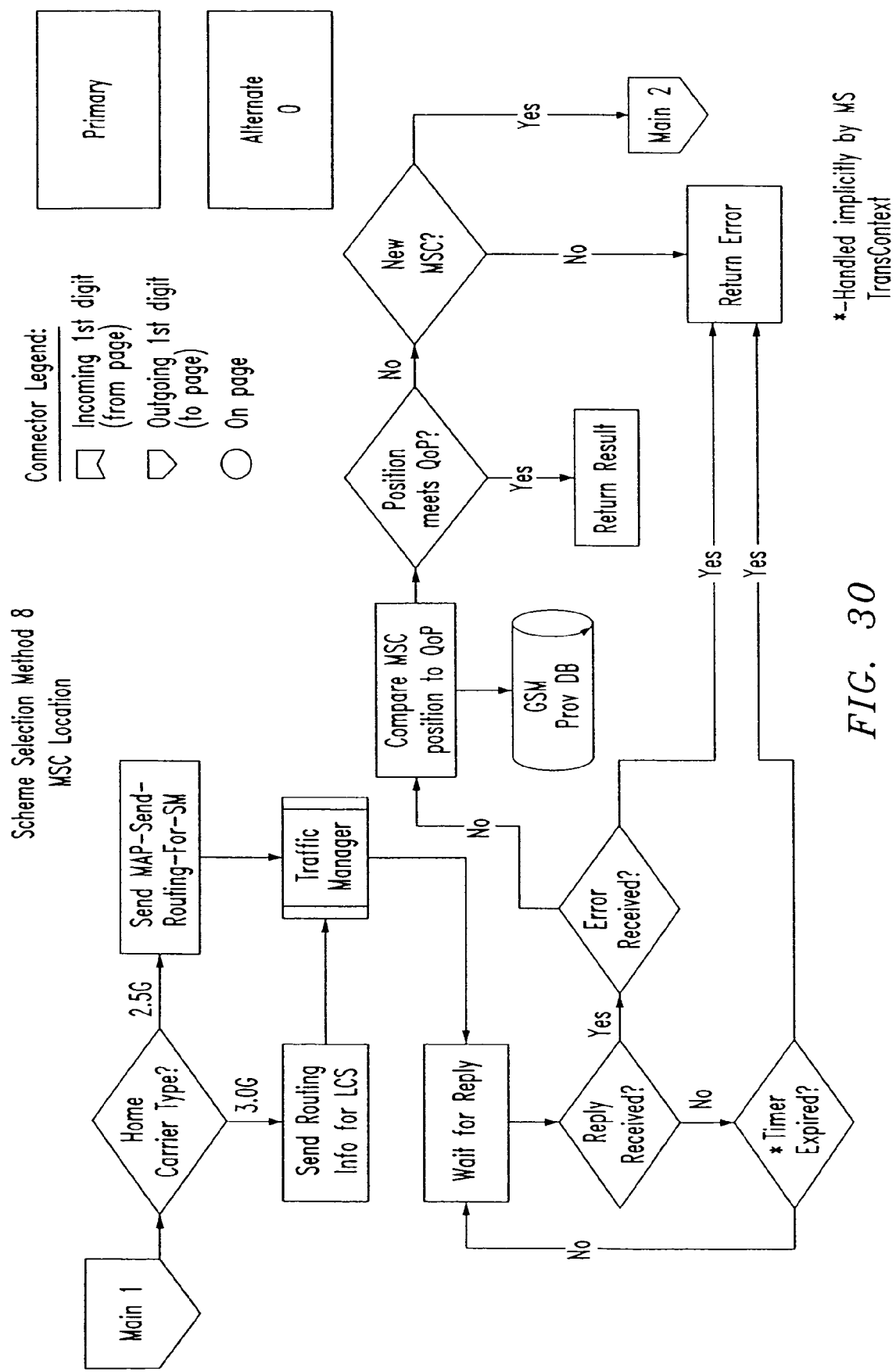
FIG. 30 shows an exemplary routine for method 8 of the scheme selection for MSC location.

FIG. 13 shows exemplary scheme selection method 8 wherein cached position information is available, in accordance with the principles of the present invention.

In particular, FIG. 13 shows method 8, which is used for the case that the cached position information is available, indicating that the serving Mobile Switch Center (Mobile Switch Center (MSC))/Serving GPRS Support Node (SGSN) supports either Mobile Application Part (MAP) version 1 or version 2, and the request Type is CURRENT.

In step 1302, a MAP_Send_Routing_For Short Message is sent by TIF 102 to Traffic Manager 603, and in step 1304 the TIF 102 waits for a reply. In step 1306 it is determined whether a reply has been received, and if a reply has been received, then the MSC position is compared to the desired Quality of Position (QoP) in step 1308 by using the PLMN database 120, and in step 1310 it is determined whether the position meets the desired QoP. If a reply has not been received, then in step 1312 it is determined whether the timer has expired, and if the timer has expired, then in step 1314 an error is returned. If the timer has not expired, then the method returns to step 1304. If the position meets the desired QoP, then a result is returned in step 1316, and if the position does not meet the desired QoP, then an error is returned in step 1314.

Other methods are possible and encompassed by the present invention. For instance, FIGS. 14 to 30 show methods of another embodiment of the present invention in accordance with the present invention.

The present invention provides a significant advantage of the reduction of unnecessary SS7 network traffic.

While the invention has been described with reference to the exemplary embodiments thereof, those skilled in the art will be able to make various modifications to the described embodiments of the invention without departing from the true spirit and scope of the invention.

What is claimed is:

1. A method of responding in a wireless network to a location request, comprising:
   determining a sensitivity of delay to a response to said location request; and
   based on said determined sensitivity, selecting between a cached last known position of a relevant subscriber, and newly determined position information.

2. The method of responding in a wireless network to a location request according to claim 1, wherein:
   said newly determined position information is determined using a GPS system.

3. The method of responding in a wireless network to a location request according to claim 1, wherein:
   said newly determined position information is determined by a wireless network.

4. The method of responding in a wireless network to a location request according to claim 1, wherein:
   said newly determined position information is determined using one of a GPS system and a land-based wireless network.

5. The method of responding in a wireless network to a location request according to claim 1, further comprising:
   determining availability of last known position information in cache.

6. The method of responding in a wireless network to a location request according to claim 1, further comprising:
   determining a roaming status of a relevant subscriber for which location information was requested; and
   selecting between a plurality of possible location determination schemes based on said determined roaming status of said relevant subscriber.

7. A method of responding in a wireless network to a location request, comprising:
   determining a sensitivity of delay to a response to said location request; and
   based on said determined sensitivity, selecting between retrieval of a cached last known position record of a relevant subscriber, if available, and a next untried selection scheme if no current position record has been retrieved.

8. The method of responding in a wireless network to a location request according to claim 7, wherein:
   said last known position record is retrieved from a cache.

9. The method of responding in a wireless network to a location request according to claim 7, further comprising:
   returning an error as said provided location information if no current position record has been retrieved.

10. The method of responding in a wireless network to a location request according to claim 7, further comprising:
    means for setting a timer before said next untried selection scheme is chosen; and
    means for returning an error as said provided location information if said timer has expired.

11. The method of responding in a wireless network to a location request according to claim 7, further comprising:
    choosing a selection scheme according to a version number of a software application communicated with.

12. The method of responding in a wireless network to a location request according to claim 7, further comprising:
    choosing a selection scheme based on a roaming status of said wireless client.

13. Apparatus for responding in a wireless network to a location request, comprising:
    means for determining a sensitivity of delay to a response to said location request; and
    means for selecting between a cached last known position of a relevant subscriber, and newly determined position information, based on said determined sensitivity.

14. The apparatus for responding in a wireless network to a location request according to claim 13, wherein:
    said newly determined position information is determined using a GPS system.

15. The apparatus for responding in a wireless network to a location request according to claim 13, wherein:
    said newly determined position information is determined by a wireless network.

16. The apparatus for responding in a wireless network to a location request according to claim 13, wherein:
    said newly determined position information is determined using one of a GPS system and a land-based wireless network.

17. The apparatus for responding in a wireless network to a location request according to claim 13, further comprising:
    means for determining availability of last known position information in cache.

18. The apparatus for responding in a wireless network to a location request according to claim 13, further comprising:

means for determining a roaming status of a relevant subscriber for which location information was requested; and means for selecting between a plurality of possible location determination schemes based on said determined roaming status of said relevant subscriber.

19. Apparatus for responding in a wireless network to a location request, comprising:

means for determining a sensitivity of delay to a response to said location request; and means for selecting between retrieval of a cached last known position record of a relevant subscriber, if available, and a next untried selection scheme if no current position record has been retrieved, based on said determined sensitivity.

20. The apparatus for responding in a wireless network to a location request according to claim 19, wherein:

said last known position record is retrieved from a cache.

21. The apparatus for responding in a wireless network to a location request according to claim 19, further comprising:

means for returning an error as said provided location information if no current position record has been retrieved.

22. The apparatus for responding in a wireless network to a location request according to claim 19, further comprising:

means for setting a timer before said next untried selection scheme is chosen; and means for returning an error as said provided location information if said timer has expired.

23. The apparatus for responding in a wireless network to a location request according to claim 19, further comprising:

means for choosing a selection scheme according to a version number of a software application communicated with.

24. The apparatus for responding in a wireless network to a location request according to claim 19, further comprising:

means for choosing a selection scheme based on a roaming status of said wireless client.

* * * * *